US012579792B2

(12) United States Patent
Kim et al.

(10) Patent No.: US 12,579,792 B2
(45) Date of Patent: Mar. 17, 2026

(54) ELECTRONIC DEVICE FOR OBTAINING IMAGE DATA RELATING TO HAND MOTION AND METHOD FOR OPERATING SAME

(71) Applicant: SAMSUNG ELECTRONICS CO., LTD., Suwon-si (KR)

(72) Inventors: Deokho Kim, Suwon-si (KR); Hwangpil Park, Suwon-si (KR); Taehyuk Kwon, Suwon-si (KR); Gunill Lee, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/634,533

(22) Filed: Apr. 12, 2024

(65) Prior Publication Data

US 2024/0265683 A1      Aug. 8, 2024

Related U.S. Application Data

(63) Continuation of application No. PCT/KR2022/012884, filed on Aug. 29, 2022.

(30) Foreign Application Priority Data

Oct. 14, 2021    (KR) ........................ 10-2021-0136900
Apr. 18, 2022    (KR) ........................ 10-2022-0047625

(51) Int. Cl.
*G06T 13/40*          (2011.01)
*G06T 15/20*          (2011.01)
(Continued)

(52) U.S. Cl.
CPC ............ *G06V 10/774* (2022.01); *G06T 13/40* (2013.01); *G06T 15/20* (2013.01); *G06T 19/20* (2013.01);
(Continued)

(58) Field of Classification Search
None
See application file for complete search history.

(56) References Cited

U.S. PATENT DOCUMENTS 7,035,436 B2    4/2006  Nakamura et al.
10,304,248 B2    5/2019  Woo et al.
(Continued)

FOREIGN PATENT DOCUMENTS

JP          2013-182554 A      9/2013
JP          2021-26759 A       2/2021
(Continued)

OTHER PUBLICATIONS

Fanqing Lin et al., "Two-Hand Global 3D Pose Estimation Using Monocular RGB", 2021 IEEE Winter Conference on Applications of Computer Vision (WACV), Jun. 2021, pp. 2372-2380, doi: 10.1109/WVACV48630.2021.00242.
(Continued)

*Primary Examiner* — Robert J Craddock
(74) *Attorney, Agent, or Firm* — Sughrue Mion, PLLC

(57)                  ABSTRACT

An electronic device for obtaining image data representing a hand gesture, the electronic device includes: a memory to store a default joint value of a preset joint, among joint values for a plurality of joints constituting a hand pose; and a processor configured to: obtain the default joint value from the memory, determine whether to generate a joint value, generate random joint values of joints other than the preset joint, obtain a pose vector corresponding to a key image frame by using the obtained default joint value and the generated random joint values, obtain a plurality of pose vectors by performing interpolation by using the obtained pose vector, and obtain a plurality of image frames repre-
(Continued)

senting the hand gesture by rendering a three-dimensional character image by using the plurality of obtained pose vectors.

15 Claims, 13 Drawing Sheets

(51) Int. Cl.

| | |
|---|---|
| *G06T 19/20* | (2011.01) |
| *G06V 10/774* | (2022.01) |
| *G06V 40/20* | (2022.01) |
| *G06F 3/01* | (2006.01) |

(52) U.S. Cl.

CPC .............. *G06V 40/28* (2022.01); *G06F 3/017* (2013.01); *G06T 2219/2004* (2013.01); *G06T 2219/2012* (2013.01); *G06T 2219/2016* (2013.01)

(56) References Cited

U.S. PATENT DOCUMENTS

| | | | |
|---|---|---|---|
| 10,657,367 | B2 | 5/2020 | Fei et al. |
| 11,055,573 | B2 | 7/2021 | Farivar et al. |
| 11,328,467 | B2 | 5/2022 | Comer et al. |
| 11,394,945 | B2 | 7/2022 | Mecca et al. |
| 11,514,650 | B2 | 11/2022 | Kim et al. |
| 11,651,625 | B2 | 5/2023 | Johnson et al. |

| | | | | |
|---|---|---|---|---|
| 2012/0162372 | A1 | | 6/2012 | Ghyme |
| 2021/0086364 | A1 | * | 3/2021 | Handa .................... G06V 20/56 |
| 2021/0158593 | A1 | * | 5/2021 | Li ............................ G06T 13/40 |
| 2021/0201551 | A1 | | 7/2021 | Wedig et al. |
| 2022/0012551 | A1 | | 1/2022 | Hosoi et al. |

FOREIGN PATENT DOCUMENTS

| | | |
|---|---|---|
| KR | 10-0532832 B1 | 12/2005 |
| KR | 10-2012-0071281 A | 7/2012 |
| KR | 10-2016-0001699 A | 1/2016 |
| KR | 10-2021-0045898 A | 4/2021 |
| KR | 10-2021-0069491 A | 6/2021 |
| KR | 10-2316389 B1 | 10/2021 |
| WO | 2020/110272 A1 | 6/2020 |

OTHER PUBLICATIONS

Kyle Lindgren et al., "Learned hand gesture classification through synthetically generated training samples", 018 IEEE/RSJ International Conference on Intelligent Robots and Systems (IROS), Oct. 2018, pp. 3937-3942, doi: 10.1109/IROS.2018.8593433.

International Search Report (PCT/ISA/210) issued by the International Searching Authority on Nov. 25, 2022 in corresponding International Application No. PCT/KR2022/012884.

Written Opinion (PCT/ISA/237) issued by the International Searching Authority on Nov. 25, 2022 in corresponding International Application No. PCT/KR2022/012884.

* cited by examiner

FIG. 1

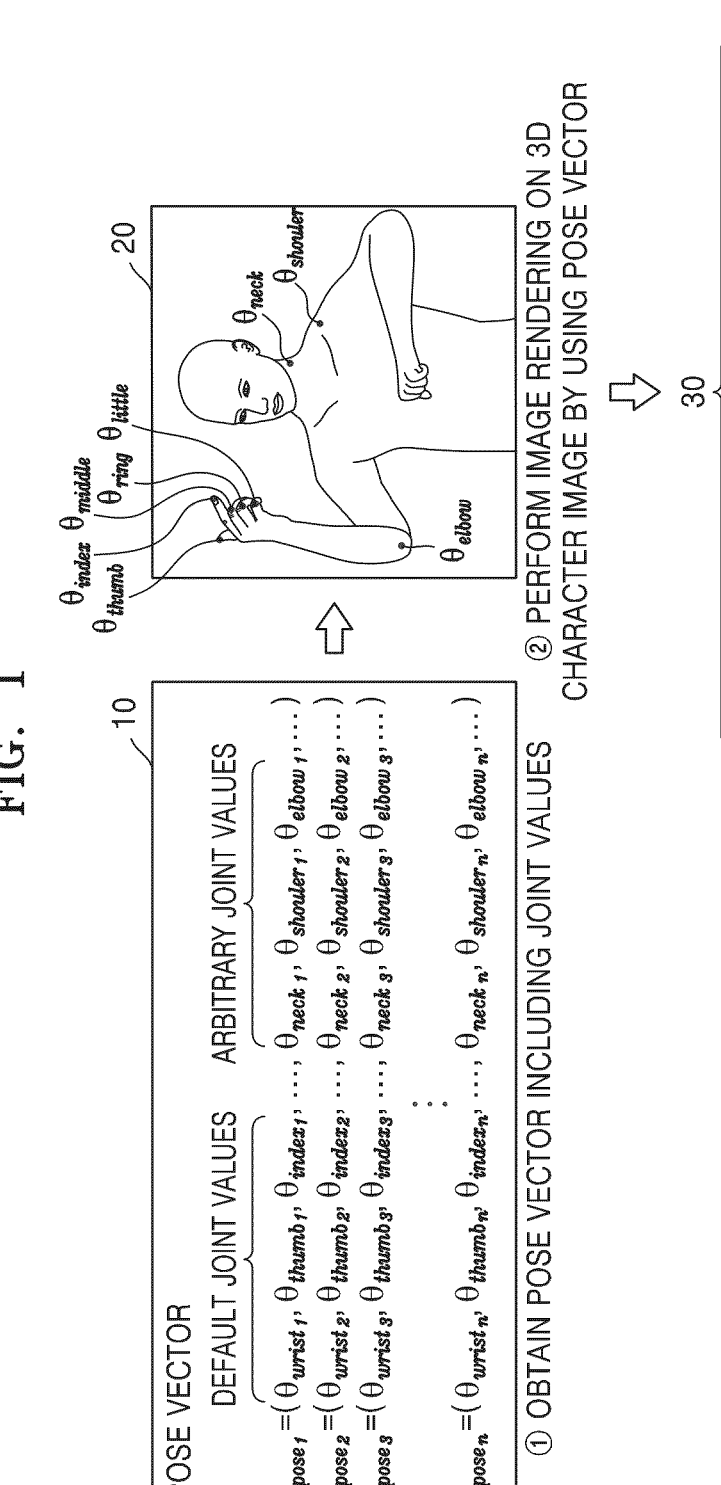

POSE VECTOR

DEFAULT JOINT VALUES     ARBITRARY JOINT VALUES $\theta_{pose_1} = (\theta_{wrist_1}, \theta_{thumb_1}, \theta_{index_1}, \dots, \theta_{neck_1}, \theta_{shoulder_1}, \theta_{elbow_1}, \dots)$ $\theta_{pose_2} = (\theta_{wrist_2}, \theta_{thumb_2}, \theta_{index_2}, \dots, \theta_{neck_2}, \theta_{shoulder_2}, \theta_{elbow_2}, \dots)$ $\theta_{pose_3} = (\theta_{wrist_3}, \theta_{thumb_3}, \theta_{index_3}, \dots, \theta_{neck_3}, \theta_{shoulder_3}, \theta_{elbow_3}, \dots)$ $\theta_{pose_n} = (\theta_{wrist_n}, \theta_{thumb_n}, \theta_{index_n}, \dots, \theta_{neck_n}, \theta_{shoulder_n}, \theta_{elbow_n}, \dots)$

10

① OBTAIN POSE VECTOR INCLUDING JOINT VALUES

20

② PERFORM IMAGE RENDERING ON 3D CHARACTER IMAGE BY USING POSE VECTOR

30

③ OBTAIN VIDEO DATA REPRESENTING HAND GESTURE $f_1$   $f_2$   $f_3$   $f_4$   $f_n$

FIG. 3

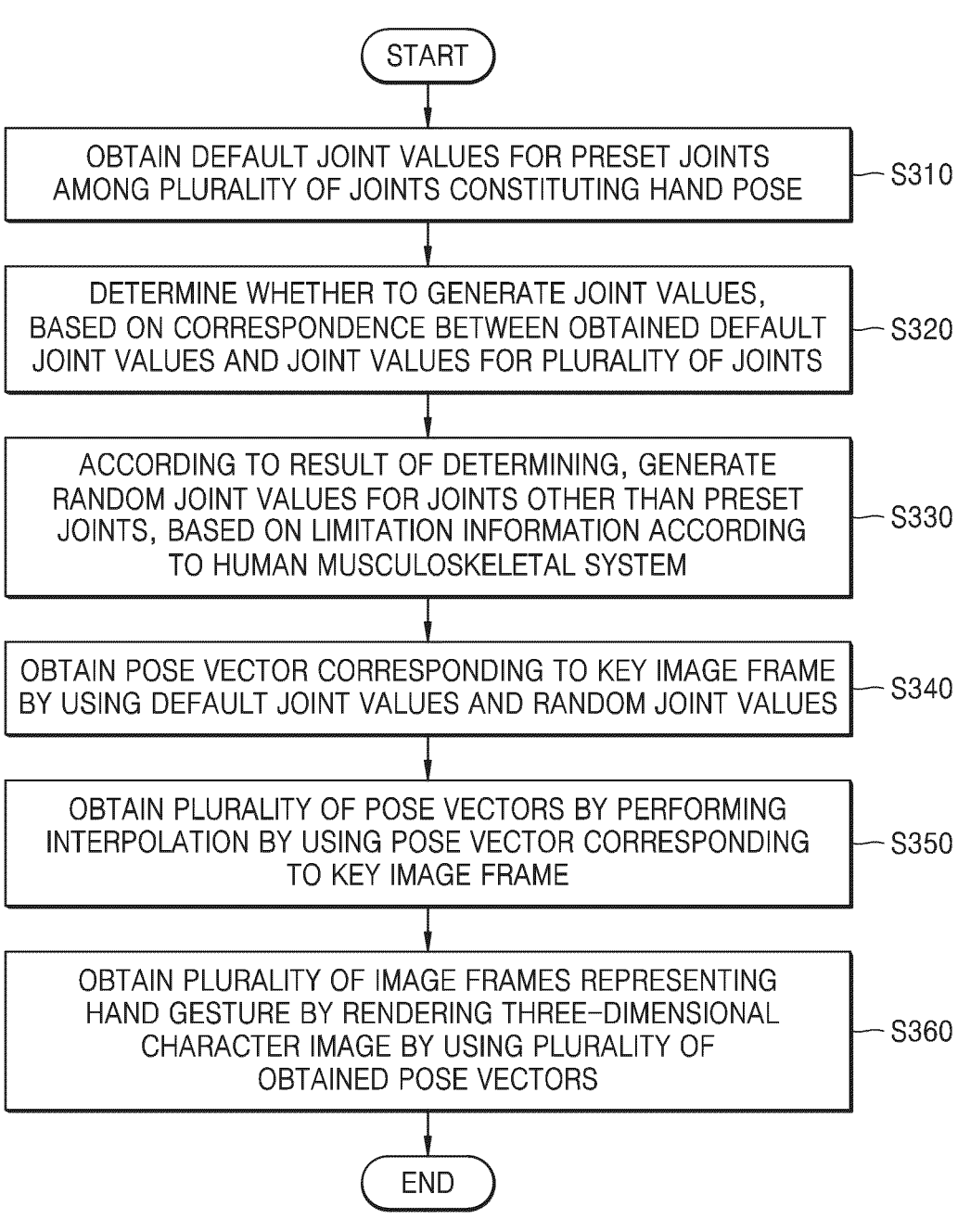

START

OBTAIN DEFAULT JOINT VALUES FOR PRESET JOINTS
AMONG PLURALITY OF JOINTS CONSTITUTING HAND POSE ~ S310

DETERMINE WHETHER TO GENERATE JOINT VALUES,
BASED ON CORRESPONDENCE BETWEEN OBTAINED DEFAULT
JOINT VALUES AND JOINT VALUES FOR PLURALITY OF JOINTS ~ S320

ACCORDING TO RESULT OF DETERMINING, GENERATE
RANDOM JOINT VALUES FOR JOINTS OTHER THAN PRESET
JOINTS, BASED ON LIMITATION INFORMATION ACCORDING
TO HUMAN MUSCULOSKELETAL SYSTEM ~ S330

OBTAIN POSE VECTOR CORRESPONDING TO KEY IMAGE FRAME
BY USING DEFAULT JOINT VALUES AND RANDOM JOINT VALUES ~ S340

OBTAIN PLURALITY OF POSE VECTORS BY PERFORMING
INTERPOLATION BY USING POSE VECTOR CORRESPONDING
TO KEY IMAGE FRAME ~ S350

OBTAIN PLURALITY OF IMAGE FRAMES REPRESENTING
HAND GESTURE BY RENDERING THREE-DIMENSIONAL
CHARACTER IMAGE BY USING PLURALITY OF
OBTAINED POSE VECTORS ~ S360

END

FIG. 4

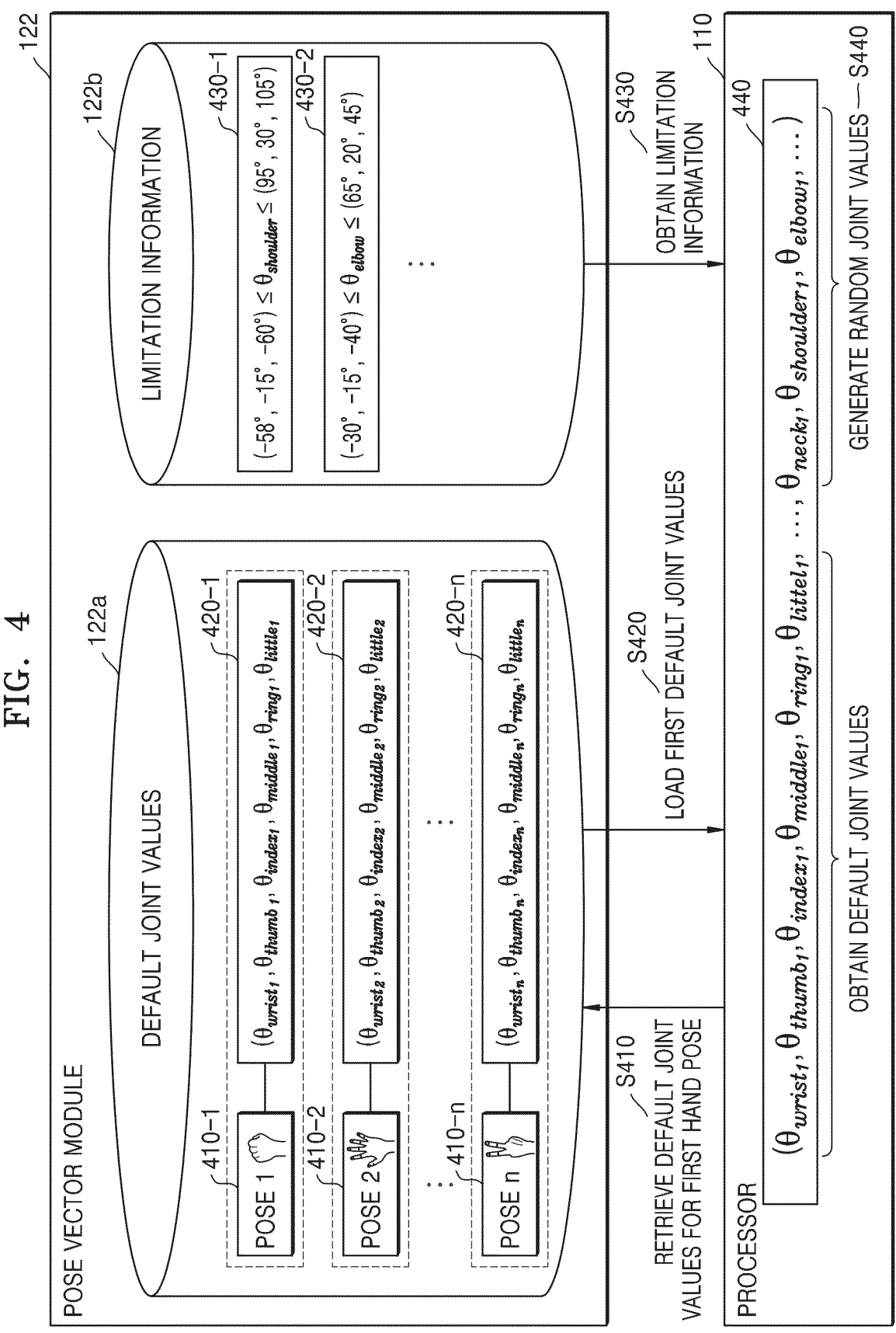

POSE VECTOR MODULE — 122

122a

DEFAULT JOINT VALUES 410-1  POSE 1 — 420-1  $(\theta_{wrist_1}, \theta_{thumb_1}, \theta_{index_1}, \theta_{middle_1}, \theta_{ring_1}, \theta_{little_1})$ 410-2  POSE 2 — 420-2  $(\theta_{wrist_2}, \theta_{thumb_2}, \theta_{index_2}, \theta_{middle_2}, \theta_{ring_2}, \theta_{little_2})$ 410-n  POSE n — 420-n  $(\theta_{wrist_n}, \theta_{thumb_n}, \theta_{index_n}, \theta_{middle_n}, \theta_{ring_n}, \theta_{little_n})$ 122b

LIMITATION INFORMATION 430-1  $(-58°, -15°, -60°) \leq \theta_{shoulder} \leq (95°, 30°, 105°)$ 430-2  $(-30°, -15°, -40°) \leq \theta_{elbow} \leq (65°, 20°, 45°)$

S430  OBTAIN LIMITATION INFORMATION

PROCESSOR — 110

S420  LOAD FIRST DEFAULT JOINT VALUES

S410  RETRIEVE DEFAULT JOINT VALUES FOR FIRST HAND POSE

440

$(\theta_{wrist_1}, \theta_{thumb_1}, \theta_{index_1}, \theta_{middle_1}, \theta_{ring_1}, \theta_{little_1}, \ldots, \theta_{neck_1}, \theta_{shoulder_1}, \theta_{elbow_1}, \ldots)$

OBTAIN DEFAULT JOINT VALUES

GENERATE RANDOM JOINT VALUES — S440

< VIDEO DATA >

ELECTRONIC DEVICE FOR OBTAINING IMAGE DATA RELATING TO HAND MOTION AND METHOD FOR OPERATING SAME

CROSS-REFERENCE TO RELATED APPLICATIONS

This application is a by-pass continuation application of International Application No. PCT/KR2022/012884, filed on Aug. 29, 2022, which is based on and claims priority to Korean Patent Application Nos. 10-2021-0136900, filed on Oct. 14, 2021, and 10-2022-0047625 filed on Apr. 18, 2022, in the Korean Intellectual Property Office, the disclosures of which are incorporated by reference herein their entireties.

BACKGROUND

1. Field

The disclosure relates to an electronic device for obtaining image data regarding a user's hand gesture to be used as an input means in an augmented reality (AR) device, and an operation method of the electronic device.

2. Description of Related Art

Augmented reality overlays a virtual image on a physical environment space of the real world or a real-world object, and augmented reality devices (e.g., smart glasses) utilizing the augmented reality technology are being used in daily life for, e.g., information retrieval, directions, and camera photography. In particular, smart glasses are also worn as fashion items and may be mainly used for outdoor activities.

Due to the nature of augmented reality devices, a touch input function is impossible, and thus, in order to provide augmented reality services, hand interaction using three-dimensional poses of a user's hands and hand gestures as input means is important as an input interface. Therefore, in order to implement more realistic augmented reality technology, a technique is required to obtain three-dimensional position information of joints in a hand, track a pose (shape) of the hand through the three-dimensional position information, and recognize a hand gesture.

In general, augmented reality devices use vision-based hand tracking technology to recognize a user's hands from an image captured by a camera built into the device, in order to allow the user to use both hands freely, without the need for an additional external input device. In order for an augmented reality device to recognize a user's hand pose or hand gesture, it is necessary to train an artificial intelligence (AI) model by using image data corresponding to particular hand poses or hand gestures as input data. Training of the AI model requires a massive amount of image data, however, obtaining image data by manually photographing poses or gestures of actual human hands by using a camera, and labeling the obtained image data with information about particular functions or interactions are time-consuming and expensive, and require a large amount of data.

SUMMARY

According to an aspect of the disclosure, an electronic device for obtaining image data representing a hand gesture, the electronic device includes: at least one memory storing a default joint value of at least one preset joint, among joint values for a plurality of joints constituting a hand pose; and at least one processor operatively connected to the at least one memory and configured to: obtain the default joint value from the at least one memory, determine whether to generate a joint value, based on correspondences between the obtained default joint value and the joint values for the plurality of joints, generate, based on a result of the determining whether to generate the joint value, random joint values of joints other than the at least one preset joint, based on limitation information according to a human musculo-skeletal system, obtain a pose vector corresponding to a key image frame by using the obtained default joint value and the generated random joint values, obtain a plurality of pose vectors by performing interpolation by using the obtained pose vector, and obtain a plurality of image frames representing the hand gesture by rendering a three-dimensional character image by using the plurality of obtained pose vectors.

According to another aspect of the disclosure, a method, performed by an electronic device, of obtaining image data representing a hand gesture, includes: obtaining a default joint value of at least one preset joint, among joint values for a plurality of joints constituting a hand pose; determining whether to generate a joint value, based on correspondences between the obtained default joint value and the joint values for the plurality of joints; generating, based on a result of the determining whether to generate the joint value, random joint values of joints other than the at least one preset joint, based on limitation information based on a human musculoskeletal system; obtaining a pose vector corresponding to a key image frame by using the obtained default joint value and the generated random joint values; obtaining a plurality of pose vectors by performing interpolation by using the obtained pose vector; and obtaining a plurality of image frames representing the hand gesture by rendering a three-dimensional character image by using the plurality of obtained pose vectors.

According to another aspect of the disclosure, a computer program product comprising a non-transitory computer-readable storage medium having recorded thereon instructions for an electronic device to perform a method of obtaining image data representing a hand gesture, the method comprising: obtaining a default joint value of at least one preset joint, among joint values for a plurality of joints constituting a hand pose; determining whether to generate a joint value, based on correspondence between the obtained default joint value and the joint values for the plurality of joints; generating, based on a result of the determining whether to generate the joint value, random joint values of joints other than the at least one preset joint, based on limitation information according to a human musculoskel-etal system; obtaining a pose vector corresponding to a key image frame by using the obtained default joint value and the generated random joint values; obtaining a plurality of pose vectors by performing interpolation by using the obtained pose vector; and obtaining a plurality of image frames representing the hand gesture by rendering a three-dimensional character image by using the plurality of obtained pose vectors.

BRIEF DESCRIPTION OF THE DRAWINGS

The disclosure may be readily understood from a combination of the following detailed descriptions and the accompanying drawings, wherein reference numbers refer to structural elements.

The above and other aspects, features, and advantages of certain embodiments of the disclosure will be more apparent from the following description taken in conjunction with the accompanying drawings, in which:

FIG. 1 illustrates an operation, performed by an electronic device, of obtaining image data representing a hand gesture by using joint value information of an upper body including hands, according to an embodiment of the disclosure;

FIG. 3 illustrates an operation method of an electronic device, according to an embodiment of the disclosure;

FIG. 4 describes an operation, performed by an electronic device, of obtaining a pose vector including a default joint value and random joint values, according to an embodiment of the disclosure;

DETAILED DESCRIPTION

Figure 2:
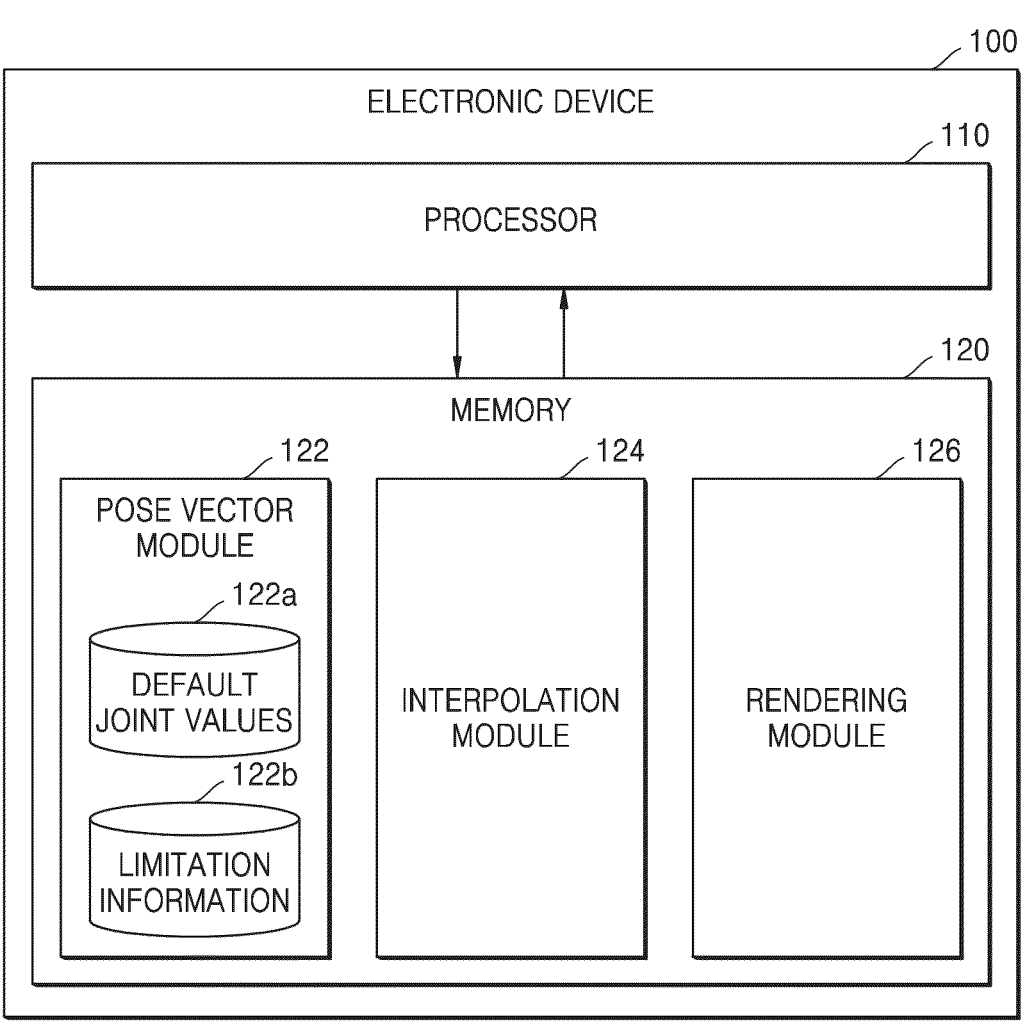
FIG. 2 illustrates components of an electronic device according to an embodiment of the disclosure.

Although the terms used herein are selected from among common terms that are currently widely used in consideration of their function in the disclosure, the terms may be different according to an intention of those of ordinary skill in the art, a precedent, or the advent of new technology. Also, in particular cases, the terms are discretionally selected by the applicant of the disclosure, in which case, the meaning of those terms will be described in detail in the corresponding embodiment. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art.

Throughout the disclosure, when a part "includes" an element, it is to be understood that the part may additionally include other elements rather than excluding other elements as long as there is no particular opposing recitation. In addition, as used herein, the terms such as " . . . er (or)", " . . . unit", " . . . module", etc., denote a unit that performs at least one function or operation, which may be implemented as hardware or software or a combination thereof.

As used herein, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a system configured to" may indicate the system "capable of" together with another device or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory.

In addition, in the disclosure, it should be understood that when components are "connected" or "coupled" to each other, the elements may be directly connected or coupled to each other, but may alternatively be connected or coupled to each other with an element therebetween, unless specified otherwise.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

In the disclosure, a 'joint' refers to a part of a human body where bones are connected to each other, and refers to one or more parts not only in a hand, such as fingers, wrist, or palm, but also in the upper body, such as neck, arm, or shoulder.

In the disclosure, 'joint values' refer to feature values for a plurality of joints in a human body. In an embodiment of the disclosure, joint values may refer to joint angle values for a plurality of joints in a finger, a wrist, a palm, a neck, an arm, an elbow, and a shoulder. However, embodiments of the disclosure are not limited thereto, and in another embodiment, joint values may include not only joint angle values for a plurality of joints in an upper body, but also three-dimensional position coordinate values of the joints.

In the disclosure, 'default joint values' refer to joint angle values that are preset for at least one joint constituting a particular hand pose among a plurality of joints. In an embodiment of the disclosure, information about default joint values may be pre-stored in a memory of an electronic device, but embodiments of the disclosure are not limited thereto.

In the disclosure, 'random joint values' refer to joint angle values for joints other than joints corresponding to default joint values, among joint angle values for a plurality of joints. In an embodiment of the disclosure, random joint values may be generated as random angle values by the electronic device. However, embodiments of the disclosure are not limited thereto. In another embodiment of the disclosure, the random joint values may not be generated by the electronic device.

Hereinafter, an embodiment of the disclosure will be described in detail with reference to the accompanying drawings to allow those of skill in the art to easily carry out the embodiment. The disclosure may, however, be embodied in many different forms and should not be construed as being limited to an embodiment set forth herein.

Hereinafter, embodiments of the disclosure will be described in detail with reference to the drawings.

FIG. 1 is a conceptual diagram illustrating an operation, performed by an electronic device, of obtaining image data representing a hand gesture by using joint value information of an upper body including hands, according to an embodiment of the disclosure.

Referring to FIG. 1, an electronic device 100 (see FIG. 2) obtains a pose vector 10 including a plurality of joint values (operation ①). The pose vector 10 may include a plurality of joint values representing a plurality of different hand poses $\theta_{pose\ 1}$ to $\theta_{pose\ n}$. In the disclosure, a 'plurality of joint values' refer to feature values for a plurality of joints in the upper body of a person. According to an embodiment of the disclosure, the plurality of joint values may refer to joint angle values for a plurality of joints. The plurality of joint values may include, for example, a wrist joint angle value $\theta_{wrist}$, finger joint angle values $\theta_{thumb}$, $\theta_{index}$, $\theta_{middle}$, $\theta_{ring}$, and $\theta_{little}$, a neck joint angle value $\theta_{neck}$, an elbow joint angle value $\theta_{elbow}$, and a shoulder joint angle value $\theta_{shoulder}$.

The electronic device 100 may obtain one or more default joint values $\theta_{wrist}$, $\theta_{thumb}$, $\theta_{index}$, $\theta_{middle}$, $\theta_{ring}$, and $\theta_{little}$ for one or more preset joints, among the plurality of joint values $\theta_{wrist}$, $\theta_{thumb}$, $\theta_{index}$, $\theta_{middle}$, $\theta_{ring}$, $\theta_{little}$, $\theta_{neck}$, $\theta_{shoulder}$, and $\theta_{elbow}$ for the plurality of joints constituting a particular hand pose. The 'default joint values $\theta_{wrist}$, $\theta_{thumb}$, $\theta_{index}$, $\theta_{middle}$, $\theta_{ring}$, and $\theta_{little}$' refer to preset joint angle values for at least one joint constituting a particular hand pose among the plurality of joints. The at least one joint having the default joint value may be preset by a user. The at least one joint may include, but is not limited to, for example, joints of a wrist, and joints of fingers including the thumb, index finger, middle finger, ring finger, and little finger. In an embodiment of the disclosure, information about the default joint values $\theta_{wrist}$, $\theta_{thumb}$, $\theta_{index}$, $\theta_{middle}$, $\theta_{ring}$, and $\theta_{little}$ may be pre-stored in a memory 120 (see FIG. 2) of the electronic device 100. The electronic device 100 may obtain the default joint values $\theta_{wrist}$, $\theta_{thumb}$, $\theta_{index}$, $\theta_{middle}$, $\theta_{ring}$, and $\theta_{little}$ by accessing the memory 120 and loading the information about the default joint values $\theta_{wrist}$, $\theta_{thumb}$, $\theta_{index}$, $\theta_{middle}$, $\theta_{ring}$, and $\theta_{little}$.

The electronic device 100 may determine whether to generate additional joint values, based on the correspondence between the obtained default joint values $\theta_{wrist}$, $\theta_{thumb}$, $\theta_{index}$, $\theta_{middle}$, $\theta_{ring}$, and $\theta_{little}$ and the joint values for the plurality of joints. In an embodiment of the disclosure, when the obtained default joint values $\theta_{wrist}$, $\theta_{thumb}$, $\theta_{index}$, $\theta_{middle}$, $\theta_{ring}$, and $\theta_{little}$ correspond to some of the joint values for all joints constituting the hand pose, and joint values of the other joints are needed, the electronic device 100 may determine that generation of additional joint values is necessary. The electronic device 100 may generate random joint values $\theta_{neck}$, $\theta_{shoulder}$, and $\theta_{elbow}$ for joints other than the at least one preset joint among the plurality of joints. The 'random joint values' $\theta_{neck}$, $\theta_{shoulder}$, $\theta_{elbow}$, refer to joint angle values for joints other than joints corresponding to the default joint values, among the joint angle values for the plurality of joints. The random joint values $\theta_{neck}$, $\theta_{shoulder}$, and $\theta_{elbow}$ may be, for example, joint angle values for joints in the neck, shoulder, elbow, or arm, among joints of the upper body, but are not limited thereto.

In an embodiment of the disclosure, the electronic device 100 may generate one or more random joint values $\theta_{neck}$, $\theta_{shoulder}$, or $\theta_{elbow}$ based on limitation information according to the human musculoskeletal system. The 'limitation information' may include information about a range of motion for each of a plurality of joints according to the anatomical characteristics of the human musculoskeletal system. The range of motion for each joint refers to, for example, the range of angle values in which each joint in a shoulder, arm, or neck is movable. In an embodiment of the disclosure, the limitation information may be pre-stored in the memory 120 of the electronic device 100, but embodiments of the disclosure are not limited thereto. In another embodiment of the disclosure, the limitation information may be input by the user. The electronic device 100 may generate the one or more random joint values $\theta_{neck}$, $\theta_{shoulder}$, and $\theta_{elbow}$ as random values, based on the limitation information. For example, the electronic device 100 may generate a random angle value within a range of motion for each of at least one joint in the shoulder, as the joint value $\theta_{shoulder}$ of the shoulder.

In FIG. 1, the electronic device 100 is described as generating the random joint values $\theta_{neck}$, $\theta_{shoulder}$, and $\theta_{elbow}$. Embodiments of the disclosure are not limited thereto. For example, when the default joint values $\theta_{wrist}$, $\theta_{thumb}$, $\theta_{index}$, $\theta_{middle}$, $\theta_{ring}$, and $\theta_{little}$ completely correspond to the plurality of joint values $\theta_{wrist}$, $\theta_{thumb}$, $\theta_{index}$, $\theta_{middle}$, $\theta_{ring}$, $\theta_{little}$, $\theta_{neck}$, $\theta_{shoulder}$, and $\theta_{elbow}$, the electronic device 100 may determine that generation of the random joint values $\theta_{neck}$, $\theta_{shoulder}$, and $\theta_{elbow}$ is not necessary. In this case, the random joint values $\theta_{neck}$, $\theta_{shoulder}$, and $\theta_{elbow}$ may not be generated, and the number thereof may be zero.

The electronic device 100 may render a three-dimensional character image 20 by using the pose vector 10 (operation ②). In an embodiment of the disclosure, the electronic device 100 may perform image rendering for applying the plurality of joint values included in the pose vector 10 to the three-dimensional character image 20. The three-dimensional character image 20 according to an embodiment of the disclosure may be a virtual three-dimensional image configured to be rendered in a particular pose through a plurality of joint angle values. The electronic device 100 may obtain a plurality of image frames $f_1$ to $f_n$ by rendering the three-dimensional character image 20 by using a plurality of joint values included in each of a plurality of pose vectors 10. The plurality of image frames $f_1$ to $f_n$ may be rendered images as if they were obtained by photographing the three-dimensional character image 20 by using a virtual camera. For example, the plurality of image frames $f_1$ to $f_n$ may be simulated images as if they were obtained by directly photographing the three-dimensional character image 20, reflecting the field of view (FOV), a lens configuration (e.g., red-green-blue (RGB) camera, mono camera, or depth camera), or the position of the virtual camera. The plurality of image frames $f_1$ to $f_n$ may represent a plurality of consecutive hand poses, respectively.

In an embodiment of the disclosure, the electronic device 100 may obtain the plurality of image frames $f_1$ to $f_n$ by rendering the three-dimensional character image 20 by using the plurality of pose vectors 10, and combining the rendered three-dimensional character image 20 with a background image. The background image may be a pre-captured image or an image selected by the user.

The electronic device 100 obtains video data 30 representing a hand gesture by sequentially arranging the plurality of image frames $f_1$ to $f_n$ (operation ③).

In general, augmented reality devices use vision-based hand tracking technology to recognize a user's hands from an image captured by a camera built into the device, in order to allow the user to use both hands freely, without the need for an additional external input device. In order for an augmented reality device to recognize a user's hand pose or hand gesture, it is necessary to first train a hand tracking artificial intelligence (AI) model by using image data corresponding to particular hand poses or hand gestures as input data. Training of the AI model requires a massive amount of image data, however, manually obtaining a large amount of image data by photographing poses or gestures of actual human hands by using a camera is time-consuming and expensive and requires a large amount of data.

The disclosure is to provide the electronic device 100 for obtaining image data to be used as input data for training a hand tracking AI model, in order to reduce the required amount of data and improve recognition accuracy for an augmented reality device to recognize a hand gesture by using vision-based hand tracking technology, and an operation method of the electronic device 100.

The electronic device 100 according to an embodiment of the disclosure renders the three-dimensional character image 20 by using the pose vector 10 including the default joint values $\theta_{wrist}$, $\theta_{thumb}$, $\theta_{index}$, $\theta_{middle}$, $\theta_{ring}$, and $\theta_{little}$ and random joint values $\theta_{neck}$, $\theta_{shoulder}$, and $\theta_{elbow}$, obtains the plurality of image frames $f_1$ to $f_n$ as a result of the rendering, and obtains video data representing a hand gesture by sequentially arranging the plurality of image frames $f_1$ to $f_n$, thereby preventing incurring of the time and cost for obtaining a massive amount of image data by manually photographing hand poses or hand gestures, and reducing the required amount of data. In addition, the electronic device 100 according to an embodiment of the disclosure generates the random joint values $\theta_{neck}$, $\theta_{shoulder}$, and $\theta_{elbow}$ by using the limitation information according to the anatomical characteristics of the human musculoskeletal system, thereby preventing generation of image data representing impossible poses due to the structure of the human body, and obtaining image data representing more natural and realistic hand poses or hand gestures. In addition, the electronic device 100 according to an embodiment of the disclosure performs rendering by using the virtual three-dimensional character image 20, thereby obtaining image data that is customized according to an ethnic group, a height, a weight, a skin color, and the like desired by the user.

FIG. 2 is a block diagram illustrating components of the electronic device 100 according to an embodiment of the disclosure.

Referring to FIG. 2, the electronic device 100 may include a processor 110 and the memory 120. The processor 110 and the memory 120 may be electrically and/or physically connected to each other.

The components illustrated in FIG. 2 are merely examples according to an embodiment of the disclosure, and the components included in the electronic device 100 are not limited to those illustrated in FIG. 2. In some embodiments, the electronic device 100 may further include other components. In an embodiment of the disclosure, the electronic device 100 may further include a data storage that stores default joint values and limitation information. In another embodiment of the disclosure, the electronic device 100 may further include a communication interface configured to perform data communication with a web-based database or an external server. The communication interface may perform data communication with a web-based database or an external server by using at least one of data communication schemes including, for example, wired local area network (LAN), wireless LAN, Wi-Fi, Bluetooth, ZigBee, Wi-Fi Direct (WFD), Infrared Data Association (IrDA), Bluetooth Low Energy (BLE), near-field communication (NFC), wireless broadband internet (WiBro), Worldwide Interoperability for Microwave Access (WiMAX), Shared Wireless Access Protocol (SWAP), Wireless Gigabit Alliance (WiGig), and radio-frequency (RF) communication.

The processor 110 may execute one or more instructions of a program stored in the memory 120. The processor 110 may include a hardware component configured to perform arithmetic operations, logic operations, input/output operations, and signal processing. For example, the processor 110 may include at least one of a CPU, a microprocessor, a graphics processing unit, an application-specific integrated circuit (ASIC), a digital signal processor (DSP), a digital signal processing device (DSPD), a programmable logic device (PLD), and a field-programmable gate array (FPGA), but is not limited thereto.

In FIG. 2, the processor 110 is illustrated as one element, but is not limited thereto. In an embodiment, one or more processors 110 may be provided.

The memory 120 may include, for example, at least one of a flash memory-type storage medium, a hard disk-type storage medium, a multimedia card micro-type storage medium, a card-type memory (e.g., secure digital (SD) or extreme digital (XD) memory), random-access memory (RAM), static RAM (SRAM), read-only memory (ROM), electrically erasable programmable ROM (EEPROM), programmable ROM (PROM), a magnetic memory, a magnetic disc, or an optical disc.

The memory 120 may store instructions related to functions or operations of the electronic device 100 to obtain image data representing a hand gesture. In an embodiment of the disclosure, the memory 120 may store at least one of instructions, an algorithm, a data structure, program code, or an application program, which is readable by the processor 110. The instructions, the algorithm, the data structure, and the program code stored in the memory 120 may be implemented in a programming or scripting language, for example, C, C++, Java, or an assembler.

The memory 120 may store instructions, an algorithm, a data structure, or program code related to a pose vector module 122, an interpolation module 124, and a rendering module 126. The 'module' included in the memory 120 refers to a unit for processing a function or an operation performed by the processor 110, and may be implemented as software such as instructions, an algorithm, a data structure, or program code.

In the following embodiments, the processor 110 may be implemented by executing instructions or program code stored in the memory 120.

The pose vector module 122 includes instructions or program code related to a function and/or an operation of obtaining a pose vector including a plurality of joint values constituting a hand pose. In an embodiment of the disclosure, a 'plurality of joint values' refer to feature values for a plurality of joints in the upper body of a person, and the feature values may refer to joint angle values. The plurality of joint values may include, for example, a wrist joint angle value, a finger joint angle value, a neck joint angle value, an elbow joint angle value, and a shoulder joint angle value, but are not limited thereto.

The pose vector module 122 includes instructions or program code related to a function and/or an operation of obtaining a pose vector by using default joint values and random joint values. The 'default joint values' refer to at least one joint angle value that is preset for joints constituting a particular hand pose among a plurality of joints. The at least one joint may include, but is not limited to, for example, joints of a wrist, and joints of fingers including the thumb, index finger, middle finger, ring finger, and little finger. However, embodiments of the disclosure are not limited thereto, and no one of the plurality of joints may be preset, and in this case, the number of default joint values may be zero.

The pose vector module 122 may include a default joint value storage unit 122a. At least one joint having a default joint value may be preset by the user and pre-stored in the default joint value storage unit 122a. The default joint value storage unit 122a may store a plurality of default joint values corresponding to a plurality of different hand poses. In an embodiment of the disclosure, the plurality of default joint values may be paired with a plurality of different hand poses and stored in the default joint value storage unit 122a. In an embodiment of the disclosure, a plurality of hand poses and a plurality of default joint values may be stored in the default joint value storage unit 122a in a key-value format. For example, in the default joint value storage unit 122a, the plurality of hand poses may be stored as keys, and the plurality of default joint values corresponding thereto may be stored as values. However, embodiments of the disclosure are not limited thereto, and no data may be stored in the default joint value storage unit 122a.

The default joint values stored in the default joint value storage unit 122a will be described in detail below with reference to FIG. 4.

The processor 110 may execute instructions or program code related to the pose vector module 122 to obtain a pose vector including a plurality of joint values corresponding to a particular hand pose to be obtained. In an embodiment of the disclosure, the processor 110 may access the default joint value storage unit 122a of the pose vector module 122 to retrieve and load default joint values constituting a particular hand pose, and thus obtain information about the retrieved default joint values (e.g., a joint angle value for at least one default joint). For example, the processor 110 may retrieve at least one default joint value (e.g., joint angle values of a wrist, a thumb, an index finger, a middle finger, a ring finger, and a little finger) corresponding to a fist clenched-fist pose, from the default joint value storage unit 122a, and extract information about at least one default joint value from the default joint value storage unit 122a based on a result of the retrieving the at least one default joint value.

The processor 110 may determine whether to generate joint values, according to the correspondence between the default joint values obtained from the default joint value storage unit 122a and the joint values for the plurality of joints constituting the particular hand pose. In an embodiment of the disclosure, when the default joint values correspond to some of the joint values for the plurality of joints, the processor 110 may determine that generation of joint values is necessary. In this case, the processor 110 may generate random joint values by using information stored in a limitation information storage unit 122b included in the pose vector module 122.

The limitation information storage unit 122b may store limitation information about joints other than at least one joint among a plurality of joints in the upper body. The 'limitation information' may include information about a range of motion for each joint according to the anatomical characteristics of the human musculoskeletal system. The range of motion for each joint refers to, for example, a range of angle values within which each joint in a shoulder, an arm, or a neck is movable through a swing or a spin about a rotation axis.

The processor 110 may generate random joint values for joints other than joints corresponding to the at least one default joint value, based on the limitation information stored in the limitation information storage unit 122b of the pose vector module 122. The random joint values may be, for example, joint angle values for joints in a neck, a shoulder, an elbow, or an arm other than at least one default joint, among the joints in the upper body, but are not limited thereto. In an embodiment of the disclosure, the processor 110 may obtain a random value within the range of motion for each joint according to the human musculoskeletal system obtained from the limitation information storage unit 122b, and generate a random joint value by using the obtained random value. The processor 110 may obtain a pose vector by using joint angle values included in the default joint values and the random joint values. In an embodiment of the disclosure, the processor 110 may obtain a pose vector including a plurality of joint angle values for each image frame. A detailed embodiment in which the processor 110 obtains a pose vector corresponding to a particular hand pose by using the pose vector module 122 will be described in detail below with reference to FIG. 4.

FIG. 2 illustrates that the default joint value storage unit 122a and the limitation information storage unit 122b are components included in the pose vector module 122 of the memory 120, but embodiments of the disclosure are not limited thereto. In an embodiment of the disclosure, the default joint value storage unit 122a and the limitation information storage unit 122b may be separate components from the memory 120. In this case, the default joint value storage unit 122a and the limitation information storage unit 122b may be configured as non-volatile memory. The non-volatile memory refers to a recording medium that may store and retain information even when power is not supplied, and may use the stored information when power is supplied. The non-volatile memory may include at least one of flash memory, a hard disk, a solid-state drive (SSD), a multimedia card micro-type memory, a card-type external memory (e.g., an SD or XD memory), ROM, a magnetic disk, or an optical disk.

However, embodiments of the disclosure are not limited thereto. In another embodiment of the disclosure, the default joint value storage unit 122a and the limitation information storage unit 122b may be implemented in the form of an external memory that is not included in the electronic device 100, or may be implemented as a web-based storage medium connected to a wired or wireless network through a communication interface. In this case, the electronic device 100 may receive default joint value information and limitation information stored in the web-based storage medium through the communication interface.

The interpolation module 124 includes instructions or program code related to a function and/or an operation of obtaining a plurality of pose vectors by performing interpolation by using a plurality of pose vectors representing different hand poses. In an embodiment of the disclosure, the interpolation module 124 may obtain a plurality of pose vectors by performing 'spherical linear interpolation' (Slerp). The processor 110 may obtain a plurality of pose vectors representing different hand poses, as pose vectors corresponding to a plurality of key image frames, and execute instructions or program code related to the interpolation module 124 to perform interpolation using the pose vectors corresponding to the plurality of key image frames. In an embodiment of the disclosure, the processor 110 may perform Slerp to obtain a plurality of pose vectors respectively corresponding to a plurality of image frames, from the pose vectors of the plurality of key image frames. A detailed embodiment in which the processor 110 obtains a plurality of pose vectors corresponding to a plurality of image frames by performing interpolation will be described in detail below with reference to FIGS. 5 and 6.

The rendering module 126 includes instructions or program code related to a function and/or an operation of rendering a three-dimensional character image by using a pose vector. The processor 110 may execute instructions or program code related to the rendering module 126 to perform image rendering by applying a plurality of joint values included in a pose vector to a three-dimensional character image. The three-dimensional character image according to an embodiment of the disclosure may be a virtual three-dimensional image configured to be rendered in a particular pose through a plurality of joint angle values.

The processor 110 may obtain a plurality of image frames by rendering the three-dimensional character image by using a plurality of joint values included in each of a plurality of pose vectors. In an embodiment of the disclosure, the processor 110 may obtain a plurality of image frames by combining the rendered three-dimensional character image with a background image. The background image may be a pre-captured image or an image selected by the user.

The processor 110 may obtain video data representing a hand gesture consisting of continuous hand poses, by arranging a plurality of image frames representing different hand poses in an order in which the plurality of image frames are obtained. A detailed embodiment in which the processor 110 renders a plurality of image frames and obtains video data by using the plurality of image frames will be described in detail below with reference to FIGS. 7 to 9.

The plurality of image frames obtained by the processor 110 may be rendered images as if they were obtained by photographing a three-dimensional character image through a virtual camera. For example, the plurality of image frames may be simulated images as if they were obtained by directly photographing the three-dimensional character image, reflecting the FOV, a lens configuration (e.g., RGB camera, mono camera, or depth camera), or the position of the virtual camera. In an embodiment of the disclosure, the processor 110 may obtain position information and specification information of a camera of an augmented reality device or a head-mounted display (HMD) device, and modify at least one of the position, size, angle, color, texture, and depth value of the three-dimensional character image in the plurality of image frames, based on the position information and the specification information of the camera. A detailed embodiment in which the processor 110 modifies a three-dimensional character image of a plurality of image frames based on position information and specification information of a camera included in an augmented reality device or an HMD will be described in detail below with reference to FIGS. 10, 11A, and 11B.

It is described above, with reference to FIG. 2, that the processor 110 obtains the pose vector including the default joint values and the random joint values by using the pose vector module 122, obtains the plurality of pose vectors from the pose vectors of the key image frames by performing interpolation by using the interpolation module 124, and obtains the plurality of image frames from the plurality of pose vectors by rendering the three-dimensional character image by using the rendering module 126, but embodiments of the disclosure are not limited thereto. In another embodiment of the disclosure, the processor 110 may not generate random joint values. When the default joint values completely correspond to the joint values for the plurality of joints constituting the hand pose, the electronic device 100 may determine that generation of joint values is not necessary. In this case, the processor 110 may not generate random joint values, and the number of random joint values may be zero. The processor 110 may obtain video data representing a hand gesture by performing image rendering by using a pose vector sequence including default joint values. A detailed embodiment in which the processor 110 determines whether to generate a joint value, based on the correspondence between default joint values and a plurality of joint values, and obtains video data based on a result of the determining whether to generate the joint value will be described in detail below with reference to FIG. 12.

FIG. 3 is a flowchart illustrating an operation method of the electronic device 100, according to an embodiment of the disclosure.

In operation S310, the electronic device 100 obtains default joint values of preset joints among a plurality of joints constituting a hand pose. The 'default joint values' refer to joint angle values that is preset for at least one joint constituting a particular hand pose among a plurality of joints. The at least one joint having the default joint value may be preset by the user. The at least one joint may include, but is not limited to, for example, joints of a wrist, and joints of fingers including the thumb, index finger, middle finger, ring finger, and little finger. In an embodiment of the disclosure, information about the default joint value may be pre-stored in the memory 120. The memory 120 may store a plurality of default joint values corresponding to a plurality of different hand poses. The electronic device 100 may obtain default joint values from the memory 120 by accessing the memory 120, retrieving a hand pose to be obtained, and loading information about the default joint values corresponding to the retrieved hand pose. However, embodiments of the disclosure are not limited thereto, and the number of default joint values may be zero. In this case, the default joint value may not be stored in the memory 120.

In operation S320, the electronic device 100 determines whether to generate joint values, based on the correspondence between the obtained default joint values and the joint values for the plurality of joints. In an embodiment of the disclosure, when the default joint values correspond to some of the joint values for the plurality of joints constituting the hand pose, the electronic device 100 may determine that generation of joint values is necessary. In another embodiment of the disclosure, when the default joint values completely correspond to the joint values for the plurality of joints constituting the hand pose, the electronic device 100 may determine that generation of joint values is not necessary. In this case, the electronic device 100 does not generate random joint values, and the number of random joint values may be zero.

In operation S330, based on a result of the determining that generation of joint values is necessary, the electronic device 100 generates random joint values for joints other than the preset joints, based on limitation information according to the human musculoskeletal system. The electronic device 100 may generate random joint values for joints other than at least one joint that has a default joint value, among a plurality of joints constituting a particular hand pose. For example, the random joint value may be a joint angle value for a joint included in a neck, a shoulder, an elbow, or an arm among joints in the upper body, but is not limited thereto.

In an embodiment of the disclosure, the electronic device 100 may generate random joint values based on the limitation information according to the human musculoskeletal system. The 'limitation information' may include information about a range of motion for each of a plurality of joints according to the anatomical characteristics of the human musculoskeletal system. The range of motion for each joint refers to, for example, the range of angle values in which each joint in a shoulder, arm, or neck is movable. In an embodiment of the disclosure, the limitation information may be pre-stored in the memory 120, but embodiments of the disclosure are not limited thereto. In another embodiment of the disclosure, the limitation information may be input by the user. The electronic device 100 may obtain a random value within the range of motion for each joint included in the limitation information, and generate a random joint value by using the obtained random value. For example, the electronic device 100 may generate a random angle value within a range of motion for each of at least one joint in a shoulder, as a joint value of the shoulder.

In operation S340, the electronic device 100 obtains a pose vector corresponding to a key image frame by using the default joint values and the random joint values. The electronic device 100 may obtain a pose vector representing a particular hand pose by using joint angle values included in the default joint values and the random joint values. The electronic device 100 may obtain the joint angle values constituting the particular hand pose, as the pose vector corresponding to the key image frame. In an embodiment of the disclosure, the electronic device 100 may obtain a plurality of pose vectors corresponding to a plurality of key image frames constituting different hand poses.

In operation S350, the electronic device 100 obtains a plurality of pose vectors by performing interpolation by using the pose vector corresponding to the obtained key image frame. The electronic device 100 may obtain a plurality of pose vectors constituting different hand poses, as pose vectors corresponding to a plurality of key image frames, and perform interpolation by using the plurality of pose vectors corresponding to the plurality of key image frames. In an embodiment of the disclosure, the electronic device 100 may perform Slerp. The electronic device 100 may obtain a plurality of pose vectors respectively corresponding to a plurality of image frames by performing Slerp by using the pose vectors corresponding to the key image frames.

In operation S360, the electronic device 100 obtains a plurality of image frames representing a hand gesture by rendering a three-dimensional character image by using the plurality of obtained pose vectors. The electronic device 100 may render a three-dimensional image by using a plurality of joint values included in each of the plurality of pose vectors. The three-dimensional character image according to an embodiment of the disclosure may be a virtual three-dimensional image configured to be rendered in a particular pose through a plurality of joint angle values. In an embodiment of the disclosure, the electronic device 100 may obtain a plurality of image frames by combining the rendered three-dimensional character image with a background image. The background image may be a pre-captured image or an image selected by the user.

The electronic device 100 may obtain video data representing a hand gesture by sequentially arranging the plurality of image frames representing different hand poses.

FIG. 4 is a diagram for describing an operation, performed by the electronic device 100, of obtaining a pose vector including a default joint value and random joint values, according to an embodiment of the disclosure.

Referring to FIG. 4, the pose vector module 122 may include the default joint value storage unit 122a and the limitation information storage unit 122b. The processor 110 may obtain default joint values by using the default joint value information included in the pose vector module 122, and generate random joint values by using limitation information.

The default joint value storage unit 122a may store a plurality of default joint values 420-1 to 420-$n$ respectively corresponding to a plurality of different hand poses 410-1 to 410-$n$. The plurality of default joint values 420-1 to 420-$n$ may include a preset joint angle value for at least one joint constituting a particular hand pose, among a plurality of joints in a human body. For example, the first default joint values 420-1 may include a first wrist joint angle value $\theta_{wrist1}$, a first thumb joint angle value $\theta_{thumb1}$, a first index-finger joint angle value $\theta_{index1}$, a first middle-finger joint angle value $\theta_{middle1}$, a first ring-finger joint angle value $\theta_{ring1}$, and a first little-finger joint angle value $\theta_{little1}$, which constitute the first hand pose 410-1. Similarly, the second default joint values 420-2 may include a second wrist joint angle value $\theta_{wrist2}$, a second thumb joint angle value $\theta_{thumb2}$, a second index-finger joint angle value $\theta_{index2}$, a second middle-finger joint angle value $\theta_{middle2}$, a second ring-finger joint angle value $\theta_{ring2}$, and a second little-finger joint angle value $\theta_{little2}$, which constitute the second hand pose 410-2. FIG. 4 illustrates that the plurality of default joint values 420-1 to 420-$n$ include joint angle values for a wrist and fingers, but embodiments of the disclosure are not limited thereto. In another embodiment of the disclosure, the plurality of default joint values 420-1 to 420-$n$ may further include joint angle values for joints other than those in the wrist and the fingers.

In an embodiment of the disclosure, the plurality of hand poses 410-1 to 410-$n$ and the plurality of default joint values 420-1 to 420-$n$ may be stored in the default joint value storage unit 122a in a key-value format. In this case, in the default joint value storage unit 122a, the plurality of hand poses 410-1 to 410-$n$ may be stored as keys, and the plurality of default joint values 420-1 to 420-$n$ corresponding thereto may be stored as values. For example, the first hand pose 410-1 representing a clenched-fist pose may be paired, as a key, with the first default joint values 420-1 as values, and stored. Similarly, the second hand pose 410-2, which is a fingers-spread pose, may be paired with the second default joint values 420-2 and stored, and the n-th pose 410-*n*, which is a V pose, may be paired with the n-th default joint values 420-*n* and stored.

In operation S410, the processor 110 retrieves default joint values for the first hand pose 410-1 stored in the default joint value storage unit 122*a* of the pose vector module 122. In an embodiment of the disclosure, the processor 110 may access the memory 120 (see FIG. 2) to retrieve the first hand pose 410-1 from among the plurality of hand poses 410-1 to 410-*n* stored in the default joint value storage unit 122*a*.

In operation S420, the processor 110 loads the first default joint values 420-1 from the default joint value storage unit 122*a*. In an embodiment of the disclosure, the processor 110 may identify the first hand pose 410-1 and the first default joint values 420-1 paired with each other in a key-value format, from among the plurality of default joint values 420-1 to 420-*n* stored in the default joint value storage unit 122*a*. The processor 110 may obtain information about the identified first default joint values 420-1 from the default joint value storage unit 122*a*.

In operation S430, the processor 110 obtains limitation information from the limitation information storage unit 122*b*. The limitation information storage unit 122*b* may store limitation information about joints other than joints having the plurality of default joint values 420-1 to 420-*n* among the plurality of joints in the human body. The 'limitation information' may include information about a range of motion for each joint according to the anatomical characteristics of the human musculoskeletal system. The range of motion for each joint refers to, for example, a range of angle values within which each joint in a shoulder, an arm, or a neck is movable through a swing or a spin about a rotation axis. For example, the limitation information storage unit 122*b* may store information about a range of motion 430-1 of a shoulder joint angle value $\theta_{shoulder}$ and a range of motion 430-2 of an elbow joint angle value $\theta_{elbow}$.

In operation S440, the processor 110 generates random joint values $\theta_{neck}$, $\theta_{shoulder}$, $\theta_{elbow}$, . . . , based on the obtained limitation information. In an embodiment of the disclosure, the processor 110 may generate the random joint values $\theta_{neck}$, $\theta_{shoulder}$, $\theta_{elbow}$, . . . , by using random values within the ranges of motion for the respective joints included in the limitation information. For example, the processor 110 may obtain information about the range of motion 430-1 for the shoulder joint included in the limitation information, generate the shoulder joint angle value $\theta_{shoulder}$ by using a random angle value within the range of motion 430-1, and generate the elbow joint angle value $\theta_{elbow}$ by using a random angle value within the range of motion 430-2 for the elbow joint. In the same manner, the processor 110 may generate the neck joint angle value $\theta_{neck}$. In some embodiments, the limitation information storage unit 122*b* may store information about ranges of motion for joints other than the neck, shoulder, and elbow, and the processor 110 may generate random joint values by using random values within the ranges of motion obtained from the limitation information storage unit 122*b*.

The processor 110 may obtain a pose vector 440 including the default joint values $\theta_{wrist1}$, $\theta_{thumb1}$, $\theta_{index1}$, $\theta_{middle1}$, $\theta_{ring1}$, and $\theta_{little1}$, and the random joint values $\theta_{neck}$, $\theta_{shoulder}$, $\theta_{elbow}$, . . . .

Figure 5:
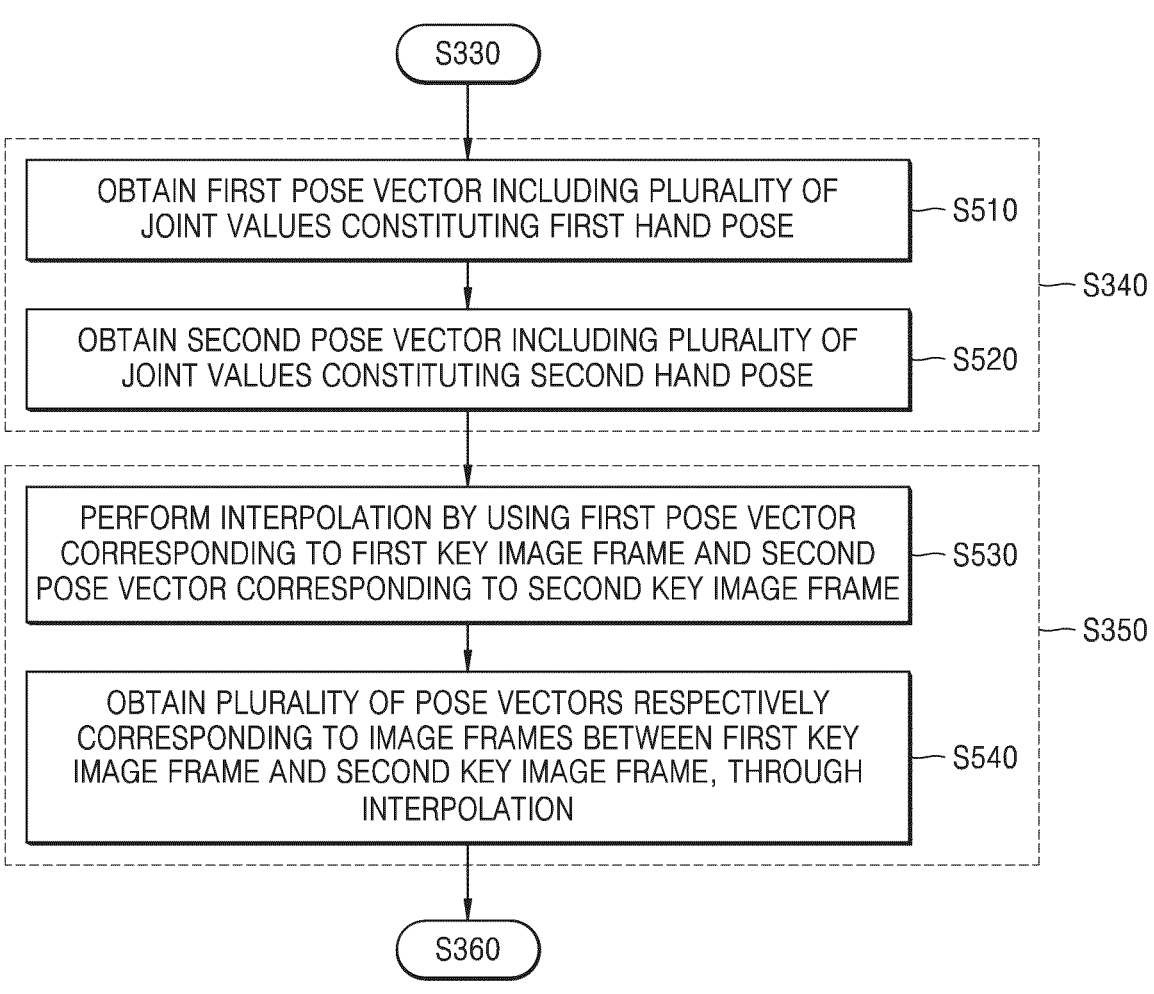
FIG. 5 illustrates a method, performed by an electronic device, of obtaining a plurality of pose vectors through interpolation, according to an embodiment of the disclosure.

FIG. 5 is a flowchart illustrating a method, performed by the electronic device 100, of obtaining a plurality of pose vectors through interpolation, according to an embodiment of the disclosure.

Operations S510 and S520 illustrated in FIG. 5 are detailed operations of operation S340 illustrated in FIG. 3. Operations S530 and S540 illustrated in FIG. 5 are detailed operations of operation S350 illustrated in FIG. 3. Operation S510 of FIG. 5 may be performed after operation S330 illustrated in FIG. 3 is performed. After operation S540 of FIG. 5 is performed, operation S360 illustrated in FIG. 3 may be performed.

Figure 6:
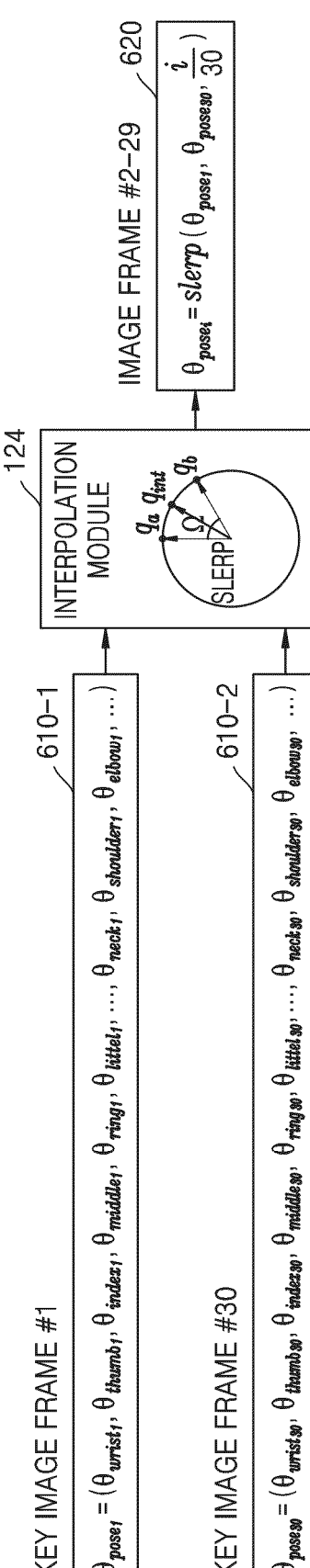
FIG. 6 describes an operation, performed by an electronic device, of obtaining a plurality of pose vectors through interpolation, according to an embodiment of the disclosure.

FIG. 6 is a diagram for describing an operation, performed by the electronic device 100, of obtaining a plurality of pose vectors 620 through interpolation, according to an embodiment of the disclosure.

Hereinafter, the operation, performed by the electronic device 100, of obtaining the plurality of pose vectors 620 will be described with reference to FIGS. 5 and 6.

Referring to FIG. 5, in operation S510, the electronic device 100 obtains a first pose vector including a plurality of joint values constituting a first hand pose. In an embodiment of the disclosure, the plurality of joint values may include default joint values and random joint values. Referring to FIG. 6 together, a first pose vector 610-1 may include default joint values including a first wrist joint angle value $\theta_{wrist1}$, a first thumb joint angle value $\theta_{thumb1}$, a first index-finger joint angle value $\theta_{index1}$, a first middle-finger joint angle value $\theta_{middle1}$, a first ring-finger joint angle value $\theta_{ring1}$, and a first little-finger joint angle value $\theta_{little1}$, and random joint values including a first neck joint angle value $\theta_{neck1}$, a first shoulder joint angle value $\theta_{shoulder1}$, and a first elbow joint angle value $\theta_{elbow1}$, which constitute the first hand pose.

Referring again to FIG. 5, in operation S520, the electronic device 100 obtains a second pose vector including a plurality of joint values constituting a second hand pose. Referring to FIG. 6 together, a second pose vector 610-2 may include default joint values including a thirtieth wrist joint angle value $\theta_{wrist30}$, a thirtieth thumb joint angle value $\theta_{thumb30}$, a thirtieth index-finger joint angle value $\theta_{index30}$, a thirtieth middle-finger joint angle value $\theta_{middle30}$, a thirtieth ring-finger joint angle value $\theta_{ring30}$, and a thirtieth little-finger joint angle value $\theta_{little30}$, and random joint values including a thirtieth neck joint angle value $\theta_{neck30}$, a thirtieth shoulder joint angle value $\theta_{shoulder30}$, and a thirtieth elbow joint angle value $\theta_{elbow30}$, which constitute the second hand pose.

In an embodiment of the disclosure, the first pose vector 610-1 may correspond to a first key image frame, and the second pose vector 610-2 may correspond to a thirtieth key image frame. Here, that a particular pose vector 'corresponds to' a particular key image frame means that the key image frame is obtained by performing rendering using the pose vector. For example, the first key image frame may be obtained by rendering a three-dimensional character image by using the first pose vector 610-1, and the thirtieth key image frame may be obtained by rendering the three-dimensional character image by using the second pose vector 610-2.

FIG. 5 illustrates that operation S520 of obtaining the second pose vector 610-2 is performed sequentially after operation S510 of obtaining the first pose vector 610-1, but the disclosure is limited thereto. In another embodiment of the disclosure, the electronic device 100 may simultaneously obtain the first pose vector 610-1 and the second pose vector 610-2 regardless of the order.

In operation S530 of FIG. 5, the electronic device 100 performs interpolation by using the first pose vector corresponding to the first key image frame and the second pose vector corresponding to the second key image frame. Referring to FIG. 6 together, the interpolation module 124 may obtain the plurality of pose vectors 620 by performing interpolation using the first pose vector 610-1 and the second pose vector 610-2. In an embodiment of the disclosure, the processor 110 (see FIG. 2) of the electronic device 100 may input the first pose vector 610-1 and the second pose vector 610-2 to the interpolation module 124, and perform Slerp by using joint angle values $\theta pose_1$ of the input first pose vector 610-1 and the joint angle values $\theta pose_{30}$ of the input second pose vector 610-2. Slerp is a method of interpolating joint angles between a plurality of joint angles $\theta_a$ and $\theta_b$, according to an interpolation ratio t, as shown in the following equation.

$$\text{slerp}(\theta_a, \theta_b, t) = \qquad \qquad \text{[Equation 1]}$$
$$\left( q_{wrist_a} \left( q_{wrist_a}^{-1} q_{wrist_b} \right)^t, q_{thumb_a} \left( q_{thumb_a}^{-1} q_{thumb_b} \right)^t, \dots \right)$$

In Equation 1, q denotes a rotational quaternion for a three-dimensional joint angle value of each joint, and t denotes an interpolation ratio.

In operation S540 of FIG. 5, the electronic device 100 obtains a plurality of pose vectors respectively corresponding to image frames between the first key image frame and the second key image frame, through interpolation. Referring to FIG. 6 together, the interpolation module 124 may obtain joint angle values $\theta pose_i$ of an i-th pose vector by using the following equation.

$$\theta_{pose_i} = \text{slerp}\left( \theta_{pose_1}, \theta_{pose_{30}}, \frac{i}{30} \right) \qquad \text{[Equation 2]}$$

In an embodiment of the disclosure, the processor 110 may input the joint angle values $\theta pose_1$ of the first pose vector 610-1 and the joint angle values $\theta pose_{30}$ of the second pose vector 610-2 to the interpolation module 124, and obtain the joint angle values $\theta pose_i$ of the i-th pose vector by using the input joint angle values $\theta pose_1$, and $\theta pose_1$, and an interpolation ratio value (i/30). For example, the processor 110 may obtain joint angle values $\theta pose_5$ of a fifth pose vector by performing Slerp to substitute 5 for i (i=5) in Equation 2. Similarly, the processor 110 may obtain joint angle values $\theta pose_i$ (i=2, 3, . . . , 29) of the plurality of pose vectors 620 respectively corresponding to second to twenty-ninth image frames, by substituting 2 to 29 for i in Equation 2.

The electronic device 100 according to the embodiment illustrated in FIGS. 5 and 6 may perform interpolation using the first pose vector 610-1 and the second pose vector 610-2 that represent different hand poses, to obtain a plurality of image frames (i.e., the second to twenty-ninth image frames), which represent continuous hand poses and naturally connect between the first key image frame representing the first hand pose and the thirtieth key image frame representing the second hand pose.

Figure 7:
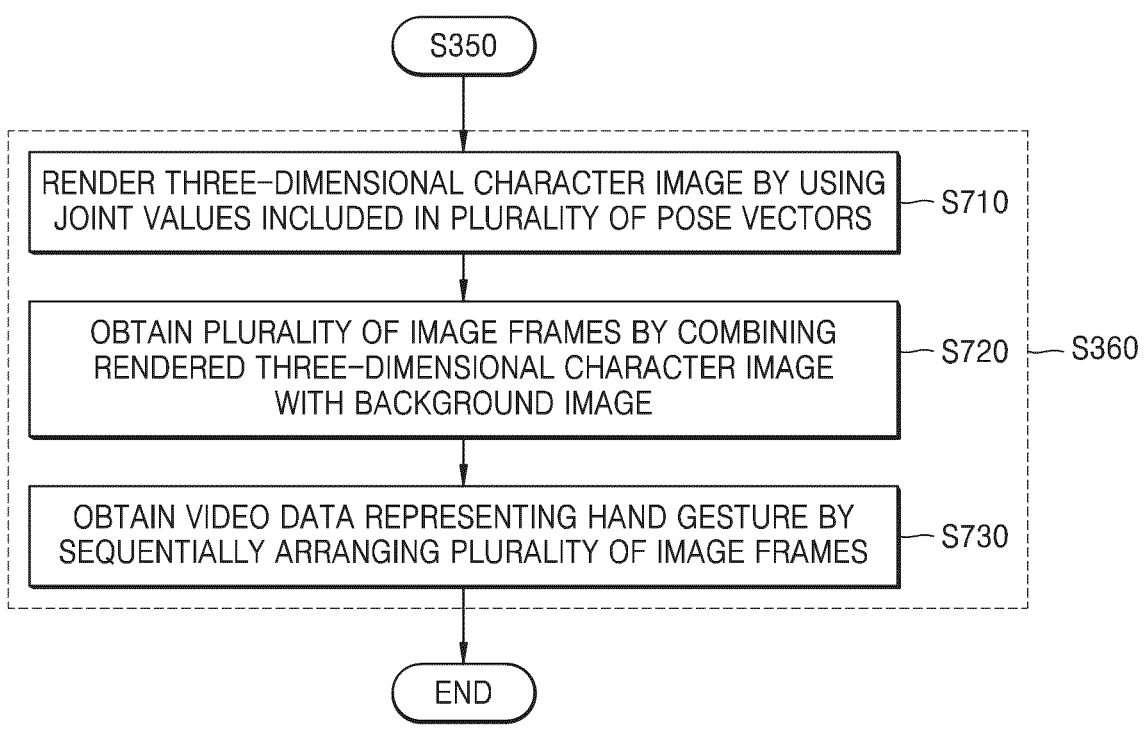
FIG. 7 illustrates a method, performed by an electronic device, of obtaining video data representing a hand gesture, according to an embodiment of the present disclosure.

FIG. 7 is a flowchart illustrating a method, performed by the electronic device 100, of obtaining video data representing a hand gesture, according to an embodiment of the disclosure.

Operations S710 to S730 illustrated in FIG. 7 are detailed operations of operation S360 illustrated in FIG. 3. Operation S710 illustrated in FIG. 7 may be performed after operation S350 illustrated in FIG. 3 is performed.

Figure 8:
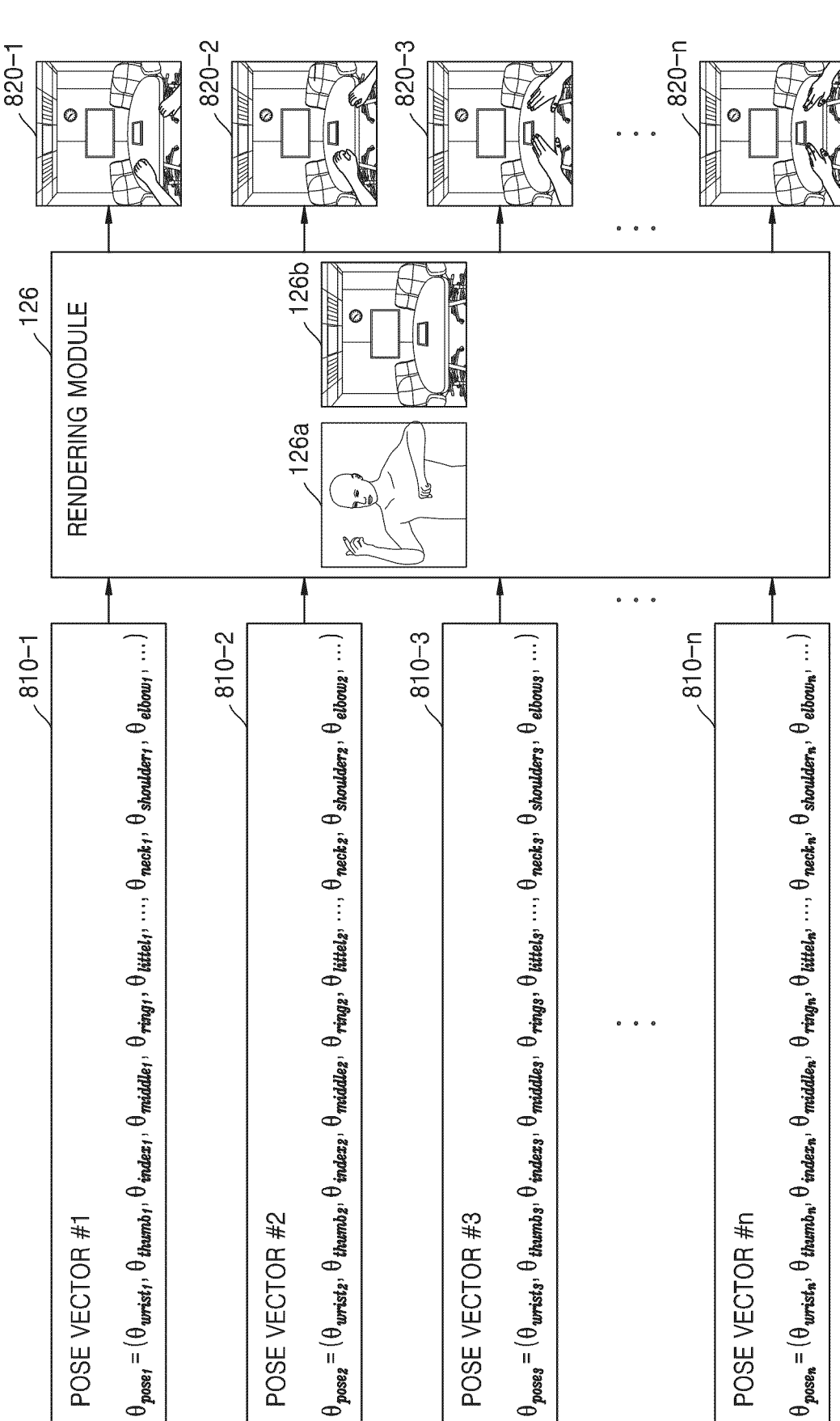
FIG. 8 illustrates an operation, performed by an electronic device, of obtaining a plurality of image frames representing continuous hand poses, according to an embodiment of the disclosure.

FIG. 8 is a diagram illustrating an operation, performed by the electronic device 100, of obtaining a plurality of image frames 820-1 to 820-n representing continuous hand poses, according to an embodiment of the disclosure.

Hereinafter, the operation, performed by the electronic device 100, of obtaining the plurality of image frames 820-1 to 820-n representing continuous hand poses will be described with reference to FIGS. 7 and 8.

Referring to FIG. 7, in operation S710, the electronic device 100 renders a three-dimensional character image by using joint values included in a plurality of pose vectors. Referring to FIG. 8 together, the processor 110 (see FIG. 2) of the electronic device 100 may input a plurality of pose vectors 810-1 to 810-n to the rendering module 126, and render a three-dimensional character image 126a by using the plurality of pose vectors 810-1 to 810-n. In an embodiment of the disclosure, the processor 110 may perform image rendering for applying joint angle values $\theta pose_1$ to $\theta pose_n$ included in the plurality of pose vectors 810-1 to 810-n to the three-dimensional character image 126a. In an embodiment of the disclosure, the three-dimensional character image 126a may be a virtual three-dimensional image configured to be rendered in particular poses corresponding to the joint angle values $\theta pose_1$ to $\theta pose_n$ through the joint angle values $\theta pose_1$ to $\theta pose_n$.

In operation S720 of FIG. 7, the electronic device 100 obtains a plurality of image frames by combining the rendered three-dimensional character image with a background image. In an embodiment of the disclosure, the background image may be a pre-captured image or an image selected by the user. Referring to FIG. 8 together, the processor 110 of the electronic device 100 may obtain the first image frame 820-1 by rendering the three-dimensional character image 126a by using the joint angle values $\theta pose_1$ included in the first pose vector 810-1 through the rendering module 126, and combining the rendered three-dimensional character image 126a with a background image 126b. In addition, the processor 110 may obtain the second image frame 820-1 by rendering the three-dimensional character image 126a by using the joint angle values $\theta pose_2$ included in the second pose vector 810-2 through the rendering module 126, and combining the rendered three-dimensional character image 126a with the background image 126b. In the same manner, the processor 110 may obtain the third image frame 820-3 to the n-th image frame 820-n by using the third pose vector 810-3 to the n-th pose vector 810-n.

The first image frame 820-1 to the n-th image frame 820-n may be simulated images rendered as if they were obtained by photographing the three-dimensional character image 126a through a virtual camera.

In operation S730 of FIG. 7, the electronic device 100 obtains video data representing a hand gesture by sequentially arranging the plurality of image frames. Referring to FIG. 8 together, the processor 110 may obtain video data representing a hand gesture by sequentially streaming the first image frame 820-1 to the n-th image frame 820-n representing continuously changing hand poses. An embodiment in which the processor 110 obtains video data representing a hand gesture will be described in detail below with reference to FIG. 9.

Figure 9:
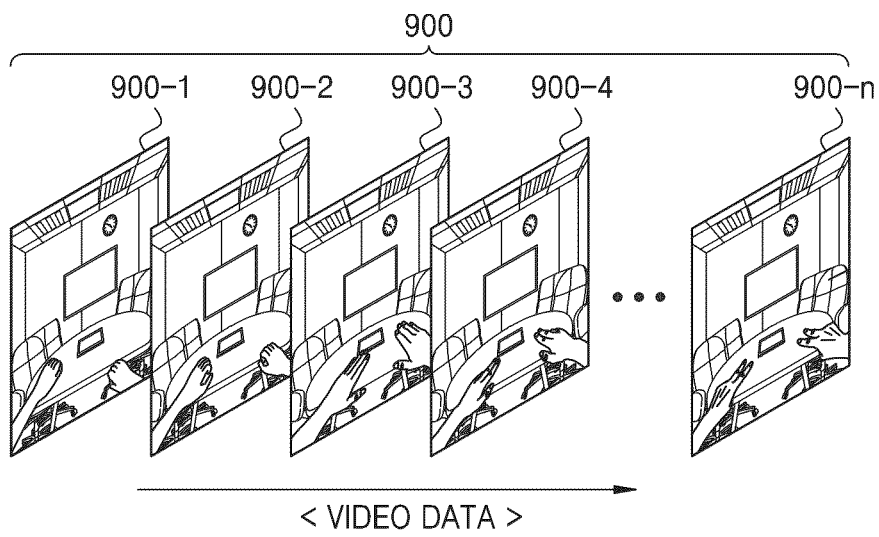
FIG. 9 illustrates an operation, performed by an electronic device, of obtaining video data representing a hand gesture, according to an embodiment of the disclosure.

FIG. 9 is a diagram illustrating an operation, performed by the electronic device 100, of obtaining video data 900 representing a hand gesture, according to an embodiment of the disclosure.

Referring to FIG. 9, the electronic device 100 may obtain a first image frame 900-1 to an n-th image frame 900-$n$. The first image frame 900-1 may be an image frame generated through rendering using a first pose vector constituting a first hand pose, the second image frame 900-2 may be an image frame generated through rendering using a second pose vector constituting a second hand pose, and the n-th image frame 900-$n$ may be an image frame generated through rendering using an n-th pose vector constituting an n-th hand pose. The first pose vector to the n-th pose vector may include joint angle values constituting continuously changing hand poses.

The processor 110 (see FIG. 2) of the electronic device 100 may obtain the video data 900 representing a hand gesture including continuous hand poses, by sequentially arranging the first image frame 900-1 to the n-th image frame 900-$n$. In an embodiment of the disclosure, the processor 110 may adjust the play speed of the video data 900 including the first image frame 900-1 to the n-th image frame 900-$n$. The electronic device 100 may further include a user input unit configured to receive a user input for adjusting the play speed of the video data 900. In this case, the processor 110 may control the play time of the first image frame 900-1 to the n-th image frame 900-$n$ according to the play speed determined by a user input received through the user input unit, and thus adjust the play speed of the video data 900.

Figure 10:
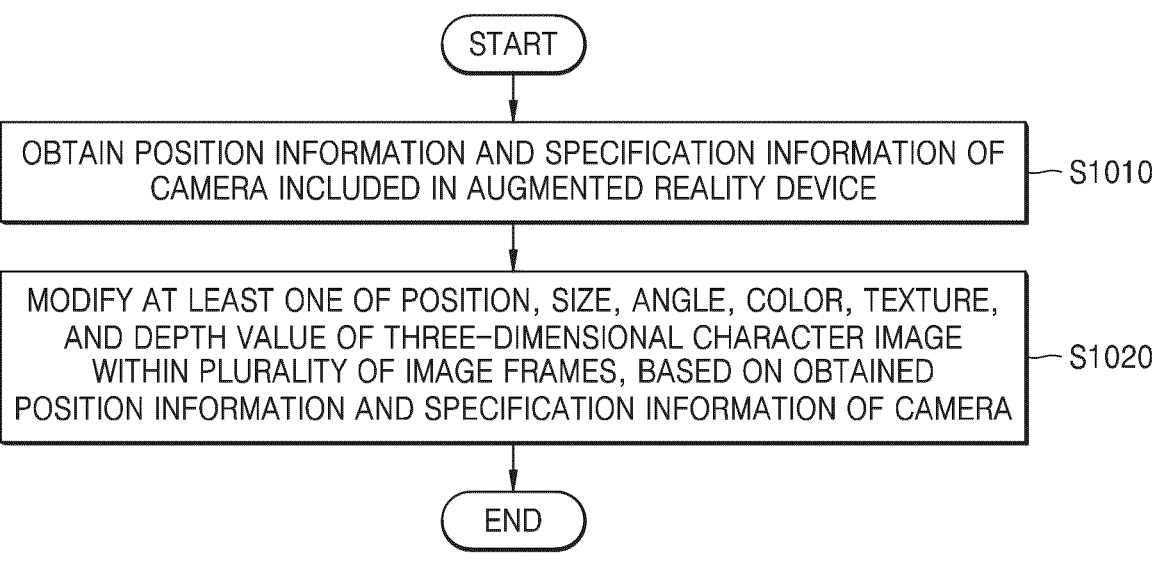
FIG. 10 illustrates a method, performed by an electronic device, of modifying image data based on information about the position and specifications of a camera of an augmented reality device, according to an embodiment of the disclosure.

FIG. 10 is a flowchart illustrating a method, performed by the electronic device 100, of modifying image data based on information about the position and specifications of a camera of an augmented reality device, according to an embodiment of the disclosure.

In operation S1010, the electronic device 100 obtains position information and specification information of a camera included in an augmented reality device. The augmented reality device is a device for recognizing a hand gesture, such as a hand gesture for selecting, pointing, or grasping, from video data obtained by the electronic device 100, and using the hand gesture as an input means. The augmented reality device may be trained by mapping a hand gesture included in video data obtained by the electronic device 100, to a label related to a particular input. The electronic device 100 may obtain position information about a position on the augmented reality device at which the camera included in the augmented reality device is installed. In addition, the electronic device 100 may obtain camera specification information including information about at least one of the FOV of the lens and configuration (e.g., RGB camera, mono camera, or depth camera) of the camera included in the augmented reality device.

In an embodiment of the disclosure, the electronic device 100 may obtain position information and specification information of the camera of the augmented reality device, from the augmented reality device or a server. However, embodiments of the disclosure are not limited thereto. In another embodiment of the disclosure, the electronic device 100 may further include a user input unit, and may obtain position information and specification information of the camera of the augmented reality device from a user input received through the user input unit.

In operation S1020, the electronic device 100 modifies at least one of the position, size, angle, color, texture, and depth value of a three-dimensional character image within a plurality of image frames, based on the obtained position information and specification information of the camera. In an embodiment of the disclosure, the electronic device 100 may modify the position, size, and angle at which a three-dimensional character image included in the video data consisting of a plurality of image frames is displayed, according to the position information of the camera the augmented reality device by which the three-dimensional character image is to be used as an input means. In addition, the electronic device 100 may modify the position, size, and angle of a background image according to the position information of the camera of the augmented reality device. In an embodiment of the disclosure, the electronic device 100 may modify the position, size, and angle of the three-dimensional character image within the plurality of image frames, according to the FOV of the camera included in the augmented reality device.

In an embodiment of the disclosure, the electronic device 100 may modify the color of the three-dimensional character image within the plurality of image frames, according to whether the camera included in the augmented reality device is an RGB camera or a mono camera. For example, in a case in which the camera included in the augmented reality device is an RGB camera, the electronic device 100 may display the three-dimensional character image and the background image included in the plurality of image frames in RGB color, and in a case in which the camera included in the augmented reality device is a mono camera, the electronic device 100 may display the three-dimensional character image and the background image within the plurality of image frames in black and white. In an embodiment of the disclosure, in a case in which the camera included in the augmented reality device is a depth camera, the electronic device 100 may generate a depth map representing depth values of respective pixels constituting the three-dimensional character image and the background image within the plurality of image frames.

Figure 11A:
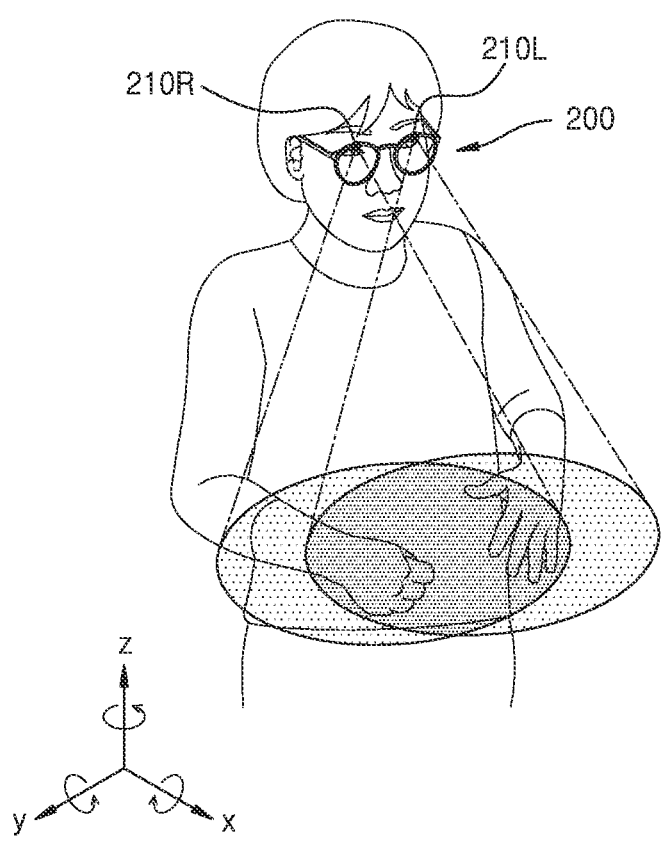
FIG. 11A illustrates an operation of photographing a user's hands according to the positions and configurations of cameras of an augmented reality device.

FIG. 11A is a diagram illustrating an operation of photographing a user's hands according to the positions and configurations of cameras 210L and 210R of an augmented reality device 200.

Referring to FIG. 11A, the augmented reality device 200 may be augmented reality glasses resembling eyeglasses to be worn on a user's face. In another embodiment of the disclosure, the augmented reality device 200 may be implemented as a device such as an HMD device or an augmented reality helmet to be worn on a user's head. However, embodiments of the disclosure are not limited thereto, and the augmented reality device 200 may be implemented as various electronic devices such as a mobile device, a smart phone, a laptop computer, a desktop computer, a tablet personal computer (PC), an electronic book terminal, a digital broadcasting terminal, a personal digital assistant (PDA), a portable multimedia player (PMP), a navigation system, an MP3 player, a camcorder, an internet protocol television (IPTV), a digital television (DTV), or a wearable device.

The augmented reality device 200 may include a plurality of cameras 210L and 210R. The augmented reality device 200 may obtain a plurality of image frames by photographing the user's hands by using the plurality of cameras 210L and 210R. FIG. 11A illustrates that the augmented reality device 200 includes a plurality of cameras including a left-eye camera 210L and a right-eye camera 210R, but embodiments of the disclosure are not limited thereto. In another embodiment of the disclosure, the augmented reality device 200 may include a single camera, or may include three or more cameras.

The augmented reality device 200 may obtain, through stereo mapping, Z-axis position coordinate values, which are depth values of a plurality of joints in the hands, from a left-eye image obtained through the left-eye camera 210L and a right-eye image obtained through the right-eye camera 210R.

The augmented reality device 200 may recognize the user's hand gesture from a plurality of image frames by using AI model. The artificial intelligence model may be configured as an object recognition model based on deep learning. In an embodiment of the disclosure, the augmented reality device 200 may recognize a hand gesture from a plurality of image frames through inference using the object recognition model, and identify a user input represented by the hand gesture.

The electronic device 100 of the disclosure may provide the augmented reality device 200 with image data simulated to represent the hand gesture included in the left-eye image and the right-eye image obtained by the augmented reality device 200 using the left-eye camera 210L and the right-eye camera 210R, respectively. By using the simulated image data provided from the electronic device 100 as training data, the augmented reality device 200 may be trained on a user input (e.g., a selection input, a pointing input, or a grasping input) corresponding to the hand gesture included in the image data. The electronic device 100 may modify the position, size, and angle of a three-dimensional character image included in the image data, based on position information and specification information of the cameras 210L and 210R included in the augmented reality device 200. A detailed embodiment in which the electronic device 100 modifies the position, size, and angle of a three-dimensional character included in image data will be described in detail below with reference to FIG. 11B.

Figure 11B:
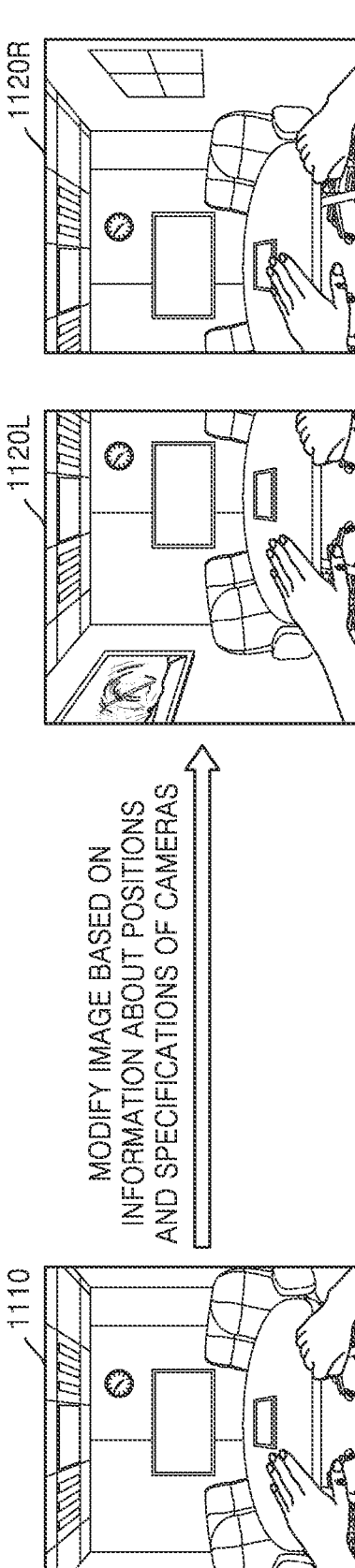
FIG. 11B describes an operation, performed by an electronic device, of modifying image data based on information about the positions and configurations of cameras of an augmented reality device, according to an embodiment of the disclosure.

FIG. 11B is a diagram for describing an operation, performed by the electronic device 100, of modifying image data based on information about the positions and configurations of the cameras 210L and 210R (see FIG. 11A) of the augmented reality device 200 (see FIG. 11A), according to an embodiment of the disclosure.

Referring to FIG. 11B, the electronic device 100 may modify an image frame 1110 including a three-dimensional character image, based on information about the positions and attributes of the cameras of the augmented reality device 200. Referring to FIG. 11A together, the augmented reality device 200 may include a stereo camera consisting of the left-eye camera 210L and the right-eye camera 210R, and the left-eye camera 210L and the right-eye camera 210R may be RGB cameras. The processor 110 (see FIG. 2) of the electronic device 100 may obtain position information and specification information of the cameras 210L and 210R of the augmented reality device 200, and obtain a left-eye image frame 1120L and a right-eye image frame 1120R from the image frame 1110 based on the obtained position information and specification information of the cameras 210L and 210R.

In the embodiment illustrated in FIG. 11B, the processor 110 may modify the position, size, and angle of an image of both hands included in the image frame 1110, based on information about the position and specifications (e.g., the FOV or whether it is an RGB camera) of the left-eye camera 210L of the augmented reality device 200. For example, the processor 110 may obtain the left-eye image frame 1120L by modifying the image of both hands to more include wrist and arm portions of an image of the left hand included in the image frame 1110 and less include an image of the right hand. In addition, the processor 110 may modify the position, size, and angle of the image of both hands included in the image frame 1110, based on information about the position and specifications (e.g., the FOV or whether it is an RGB camera) of the right-eye camera 210R of the augmented reality device 200. For example, the processor 110 may obtain the right-eye image frame 1120R by modifying the image of both hands not to include the wrist and arm portions of the image of the left hand included in the image frame 1110, and to more include wrist and arm portions of the image of the right hand.

In the related art, when a plurality of pieces of image data representing hand gestures are generated but cannot be utilized because they are not suitable for the position or specifications of a camera of another device (e.g., the augmented reality device 200) to which the plurality of pieces of image data are applied, it is necessary to obtain again image data suitable for the other device. The electronic device 100 according to the embodiments illustrated in FIGS. 10, 11A, and 11B modifies a three-dimensional character image included in a plurality of obtained image frames based on position information and specification information of the camera included in the augmented reality device 200, thereby processing and reconfiguring existing image data without the need to obtain image data again. Therefore, the electronic device 100 according to an embodiment of the disclosure provides technical effects of reducing the time and cost consumed when newly obtaining image data suitable for the other device, and improving the utilization of previously obtained image data.

Figure 12:
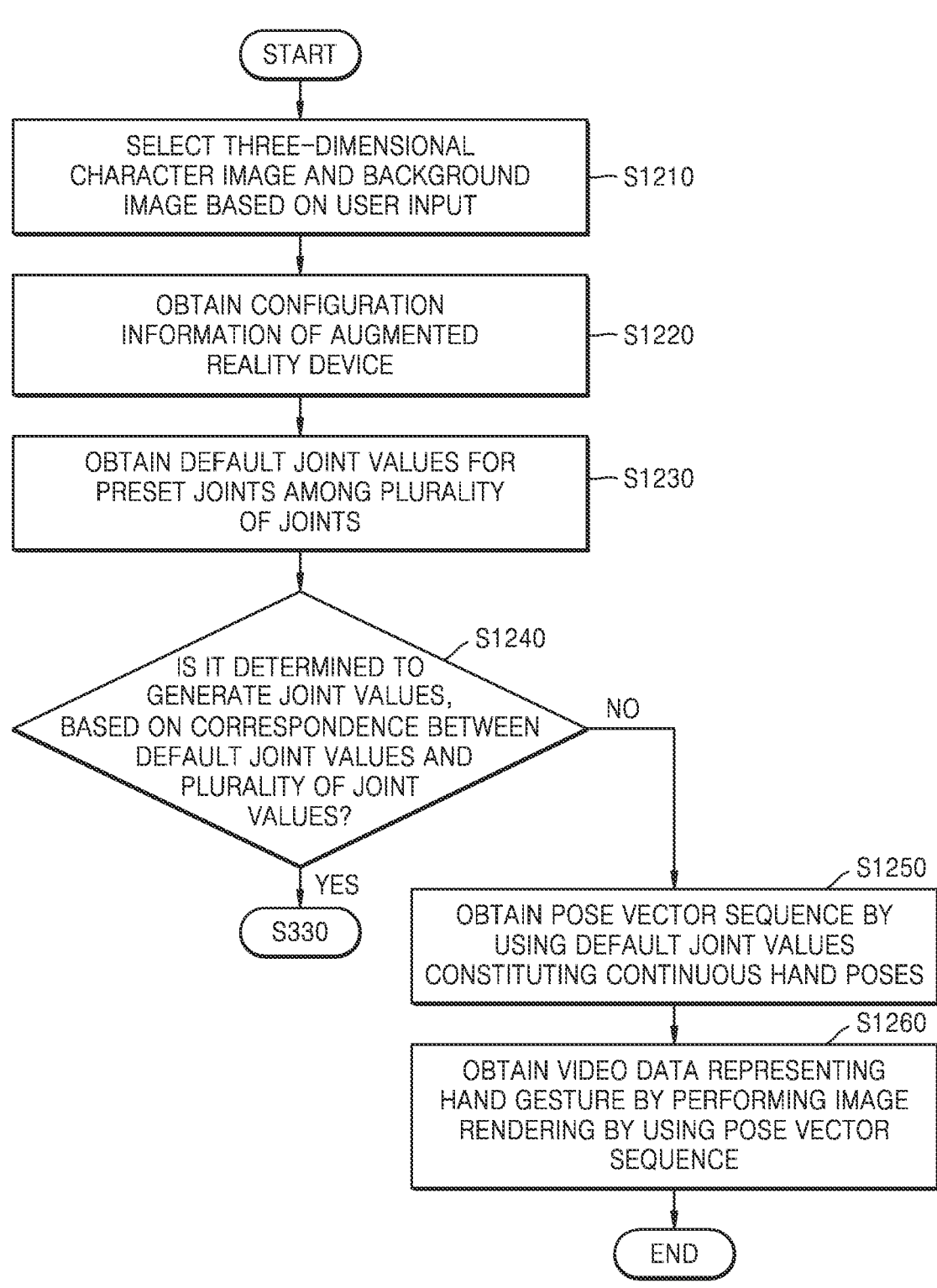
FIG. 12 illustrates a method, performed by an electronic device, of determining whether to generate joint values and obtaining video data representing a hand gesture according to whether to generate the joint values, according to an embodiment of the disclosure.

FIG. 12 is a flowchart illustrating a method, performed by the electronic device 100, of determining whether to generate joint values and obtaining video data representing a hand gesture according to whether to generate the joint values, according to an embodiment of the disclosure.

Operations S1210 to S1240 illustrated in FIG. 12 are performed before operation S330 illustrated in FIG. 3 is performed.

In operation S1210, the electronic device 100 selects a three-dimensional character image and a background image based on a user input.

In operation S1220, the electronic device 100 obtains configuration information of an augmented reality device. In an embodiment of the disclosure, the electronic device 100 may obtain position information and specification information of a camera included in the augmented reality device, from the augmented reality device or a server. However, embodiments of the disclosure are not limited thereto, and in another embodiment of the disclosure, the electronic device 100 may further include a user input unit, and may obtain position information and specification information of the camera of the augmented reality device from a user input received through the user input unit.

In operation S1230, the electronic device 100 obtains default joint values of preset joints among a plurality of joints. Operation S1230 is the same as operation S310 illustrated in FIG. 3, and thus, redundant descriptions will be omitted.

In operation S1240, the electronic device 100 determines whether to generate joint values, based on the correspondence between the default joint values and a plurality of joint values. In an embodiment of the disclosure, it may be determined whether default joint values completely correspond to joint values of a plurality of joints constituting a particular hand pose.

When it is determined that the default joint values completely correspond to the joint values for the plurality of joints (S330), the electronic device 100 determines to generate joint values. In this case, the electronic device 100 generates random joint values based on limitation information pre-stored in the memory 120 (see FIG. 2), according to operation S330.

When it is determined that the default joint values correspond to only some of the joint values for the plurality of joints (S1250), the electronic device 100 determines not to generate joint values. In operation S1250, the electronic device 100 obtains a pose vector sequence by using default joint values constituting continuous hand poses. In an embodiment of the disclosure, the electronic device 100 may obtain the pose vector sequence by using default joint values pre-stored in the memory 120, but embodiments of the disclosure are not limited thereto. In another embodiment of the disclosure, the electronic device 100 may obtain the pose vector sequence from an external server or an external device. In another embodiment of the disclosure, the electronic device 100 may obtain the pose vector sequence through a user input for inputting information about joint values constituting continuous hand poses.

In operation S1260, the electronic device 100 obtains video data representing a hand gesture by performing image rendering by using the pose vector sequence. In an embodiment of the disclosure, the electronic device 100 may obtain a plurality of image frames by rendering the three-dimensional character image by using a plurality of pose vectors included in the pose vector sequence, and combining the rendered three-dimensional character image with the background image. The electronic device 100 may obtain the video data representing the hand gesture by sequentially arranging the plurality of image frames.

An electronic device according to an embodiment of the disclosure may include a memory storing a default joint value of at least one preset joint, among joint values of a plurality of joints constituting a hand pose, and at least one processor. In an embodiment of the disclosure, the at least one processor may obtain the default joint value from the memory. The at least one processor may determine whether to generate a joint value, based on correspondence between the obtained default joint value and the joint values of the plurality of joints. Based on a result of the determining whether to generate the joint value, the at least one processor may generate random joint values of joints other than the at least one preset joint, based on limitation information according to the human musculoskeletal system. The at least one processor may obtain a pose vector corresponding to a key image frame by using the default joint value and the generated random joint values. The at least one processor may obtain a plurality of pose vectors by performing interpolation by using the obtained pose vector. The at least one processor may obtain a plurality of image frames representing a hand gesture by rendering a three-dimensional character image by using the plurality of obtained pose vectors.

In an embodiment of the disclosure, the joint values may be joint angle values of a plurality of joints in a finger, a wrist, a palm, a neck, an arm, and a shoulder.

In an embodiment of the disclosure, the default joint value may be at least one joint angle value that is preset for at least one joint constituting a particular hand pose, among a plurality of joints.

In an embodiment of the disclosure, the limitation information may include information about a range of motion for each joint according to the anatomical characteristics of the human musculoskeletal system.

In an embodiment of the disclosure, the at least one processor may generate a random joint value by using a random value within a range of motion for each joint.

In an embodiment of the disclosure, the at least one processor may obtain a first pose vector including a plurality of joint values constituting a first hand pose, and a second pose vector including a plurality of joint values constituting a second hand pose. The at least one processor may perform interpolation by using the first pose vector corresponding to a first key image frame and the second pose vector corresponding to a second key image frame. The at least one processor may obtain, through the interpolation, the plurality of pose vectors including joint values respectively corresponding to image frames between the first key image frame and the second key image frame.

In an embodiment of the disclosure, the at least one processor may obtain the plurality of pose vectors by performing Slerp.

In an embodiment of the disclosure, the at least one processor may obtain the plurality of image frames by combining the rendered three-dimensional character image with a background image.

In an embodiment of the disclosure, the at least one processor may obtain the plurality of image frames representing different hand poses by rendering the three-dimensional character image by using the joint values included in the plurality of obtained pose vectors, and obtain the video data representing the hand gesture by sequentially arranging the plurality of obtained image frames.

In an embodiment of the disclosure, the at least one processor may obtain position information and specification information of a camera included in an augmented reality device. The at least one processor may modify at least one of a position, a size, an angle, a color, a texture, and a depth value of the three-dimensional character image within the plurality of image frames, based on the obtained position information and specification information of the camera.

According to another aspect of the disclosure, provided is a method, performed by an electronic device, of obtaining image data representing a hand gesture. In an embodiment of the disclosure, an operation method of an electronic device may include obtaining a default joint value of at least one preset joint, among joint values of a plurality of joints constituting a hand pose. The operation method may include determining whether to generate a joint value, based on correspondence between the obtained default joint value and the joint values of the plurality of joints. The operation method may include generating, based on a result of the determining whether to generate the joint value, random joint values of joints other than the at least one preset joint, based on limitation information according to the human musculoskeletal system. The operation method may include obtaining a pose vector corresponding to a key image frame by using the default joint value and the generated random joint values. The operation method may include obtaining a plurality of pose vectors by performing interpolation by using the obtained pose vector. The operation method may include obtaining a plurality of image frames representing a hand gesture by rendering a three-dimensional character image by using the plurality of obtained pose vectors.

In an embodiment of the disclosure, the default joint value may be at least one joint angle value that is preset for at least one joint constituting a particular hand pose, among a plurality of joints.

In an embodiment of the disclosure, information about the default joint value may be pre-stored in a memory. The obtaining of the default joint value may include accessing the memory and retrieving the information about the default joint value stored in the memory.

In an embodiment of the disclosure, the limitation information may include information about a range of motion for each of a plurality of joints according to anatomical characteristics of the human musculoskeletal system.

In an embodiment of the disclosure, the obtaining of the pose vector may include obtaining a first pose vector including a plurality of joint values constituting a first hand pose, and obtaining a second pose vector including a plurality of joint values constituting a second hand pose. The obtaining of the plurality of pose vectors may include performing interpolation by using the first pose vector corresponding to a first key image frame and the second pose vector corresponding to a second key image frame. The obtaining of the plurality of pose vectors may include obtaining, through the interpolation, the plurality of pose vectors including joint values respectively corresponding to image frames between the first key image frame and the second key image frame.

In an embodiment of the disclosure, the obtaining of the plurality of pose vectors may include obtaining the plurality of pose vectors by performing Slerp.

In an embodiment of the disclosure, the obtaining of the plurality of image frames representing the hand gesture may include obtaining the plurality of image frames by combining the rendered three-dimensional character image with a background image.

In an embodiment of the disclosure, the obtaining of the plurality of image frames representing the hand gesture may include obtaining the plurality of image frames representing different hand poses by rendering the three-dimensional character image by using the joint values included in the plurality of obtained pose vectors, and obtaining the video data representing the hand gesture by sequentially arranging the plurality of obtained image frames.

In an embodiment of the disclosure, the method may include obtaining position information and specification information of a camera included in an augmented reality device. The method may further include modifying at least one of a position, a size, an angle, a color, a texture, and a depth value of the three-dimensional character image within the plurality of image frames, based on the obtained position information and specification information of the camera.

According to another embodiment of the disclosure, provided is a computer program product including a computer-readable storage medium having recorded thereon a program to be executed by a computer. The storage medium may include instructions for obtaining a default joint value of at least one preset joint, among joint values of a plurality of joints constituting a hand pose. The storage medium may include instructions for determining whether to generate a joint value, based on correspondence between the obtained default joint value and the joint values of the plurality of joints. The storage medium may include instructions for generating, based on a result of the determining whether to generate the joint value, random joint values of joints other than the at least one preset joint, based on limitation information according to the human musculoskeletal system. The storage medium may include instructions for obtaining a pose vector corresponding to a key image frame by using the default joint value and the generated random joint values. The storage medium may include instructions for obtaining a plurality of pose vectors by performing interpolation by using the obtained pose vector. The storage medium may include instructions for obtaining a plurality of image frames representing a hand gesture by rendering a three-dimensional character image by using the plurality of obtained pose vectors.

A program executable by the electronic device 100 described herein may be implemented as a hardware component, a software component, and/or a combination of hardware components and software components. The program is executable by any system capable of executing computer-readable instructions.

The software may include a computer program, code, instructions, or a combination of one or more thereof, and may configure the processor to operate as desired or may independently or collectively instruct the processor.

The software may be implemented as a computer program that includes instructions stored in computer-readable storage media. The computer-readable storage media may include, for example, magnetic storage media (e.g., ROM, RAM, floppy disks, hard disks, etc.) and optical storage media (e.g., a compact disc ROM (CD-ROM), a digital video disc (DVD), etc.). The computer-readable recording medium may be distributed in computer systems connected via a network and may store and execute computer-readable code in a distributed manner. The medium is readable by a computer, stored in a memory, and executable by a processor.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

In addition, a program according to embodiments disclosed herein may be provided in a computer program product. The computer program product may be traded as commodities between sellers and buyers.

The computer program product may include a software program and a computer-readable recording medium storing the software program. For example, the computer program product may include a product (e.g., a downloadable application) in the form of a software program electronically distributed through a manufacturer of the electronic device 100 or an electronic market (e.g., Samsung Galaxy Store). For electronic distribution, at least part of the software program may be stored in a storage medium or temporarily generated. In this case, the storage medium may be a storage medium of a server of the manufacturer of the electronic device 100, a server of the electronic market, or a relay server that temporarily stores the software program.

The computer program product may include a storage medium of a server or a storage medium of the electronic device 100, in a system consisting of the electronic device 100, the augmented reality device 200, and/or the server. Alternatively, when there is a third device (e.g., a mobile device) communicating with the electronic device 100, the computer program product may include a storage medium of the third device. Alternatively, the computer program product may include the software program itself, which is transmitted from the electronic device 100 to the third device or transmitted from the third device to the electronic device.

In this case, any one of the electronic device 100, the augmented reality device 200, and the third device may execute the computer program product to perform the method according to the disclosed embodiments. Alternatively, two or more of the electronic device 100, the augmented reality device 200, and the third device may execute the computer program product to execute the method according to the disclosed embodiments in a distributed manner.

For example, the electronic device 100 may execute the computer program product stored in the memory 120 (see FIG. 2) to control another electronic device (e.g., a mobile device) communicatively connected to the electronic device 100 to perform the method according to the disclosed embodiments.

As another example, the third device may execute the computer program product to control an electronic device communicatively connected to the third device to perform the method according to the disclosed embodiments.

When the third device executes the computer program product, the third device may download the computer program product from the electronic device 100 and execute the downloaded computer program product. Alternatively, the third device may execute the computer program product provided in a pre-loaded state to perform the methods according to the disclosed embodiments.

Although the embodiments have been described with the limited embodiments and the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

What is claimed is:

1. An electronic device for obtaining image data representing a hand gesture, the electronic device comprising:

at least one memory storing a default joint value of at least one preset joint, among joint values for a plurality of joints constituting a hand pose; and at least one processor operatively connected to the at least one memory and configured to:

obtain the default joint value from the at least one memory, determine whether to generate a joint value, based on correspondences between the obtained default joint value and the joint values for the plurality of joints, generate, based on a result of the determining whether to generate the joint value, random joint values of joints other than the at least one preset joint, based on limitation information according to a human musculoskeletal system, obtain a pose vector corresponding to a key image frame by using the obtained default joint value and the generated random joint values, obtain a plurality of pose vectors by performing interpolation by using the obtained pose vector, and obtain a plurality of image frames representing the hand gesture by rendering a three-dimensional character image by using the plurality of obtained pose vectors.

2. The electronic device of claim 1, wherein the limitation information comprises information about a range of motion for each joint based on anatomical characteristics of the human musculoskeletal system.

3. The electronic device of claim 2, wherein the at least one processor is further configured to generate the random joint values by using random values within the range of motion for each joint.

4. The electronic device of claim 1, wherein the at least one processor is further configured to:

obtain a first pose vector comprising a plurality of joint values constituting a first hand pose, and a second pose vector comprising a plurality of joint values constituting a second hand pose, perform interpolation by using the first pose vector corresponding to a first key image frame and the second pose vector corresponding to a second key image frame, and obtain, through the interpolation, the plurality of pose vectors comprising joint values respectively corresponding to image frames between the first key image frame and the second key image frame.

5. The electronic device of claim 1, wherein the at least one processor is further configured to obtain the plurality of image frames by combining the rendered three-dimensional character image with a background image.

6. The electronic device of claim 1, wherein the at least one processor is further configured to:

obtain the plurality of image frames representing different hand poses by rendering the three-dimensional character image by using the joint values in the plurality of obtained pose vectors, and obtain video data representing the hand gesture by sequentially arranging the plurality of obtained image frames.

7. The electronic device of claim 1, wherein the at least one processor is further configured to:

obtain position information and specification information of a camera in an augmented reality device, and modify at least one of a position, a size, an angle, a color, a texture, and a depth value of the three-dimensional character image within the plurality of image frames, based on the obtained position information and the obtained specification information of the camera.

8. A method, performed by an electronic device, of obtaining image data representing a hand gesture, the method comprising:

obtaining a default joint value of at least one preset joint, among joint values for a plurality of joints constituting a hand pose;

determining whether to generate a joint value, based on correspondences between the obtained default joint value and the joint values for the plurality of joints;

generating, based on a result of the determining whether to generate the joint value, random joint values of joints other than the at least one preset joint, based on limitation information based on a human musculoskeletal system;

obtaining a pose vector corresponding to a key image frame by using the obtained default joint value and the generated random joint values;

obtaining a plurality of pose vectors by performing interpolation by using the obtained pose vector; and obtaining a plurality of image frames representing the hand gesture by rendering a three-dimensional character image by using the plurality of obtained pose vectors.

9. The method of claim 8, wherein information about the default joint value is pre-stored in at least one memory, and wherein the obtaining the default joint value comprises accessing the at least one memory and retrieving the information about the default joint value stored in the at least one memory.

10. The method of claim 8, wherein the limitation information comprises information about a range of motion for each of a plurality of joints based on anatomical characteristics of the human musculoskeletal system.

11. The method of claim 8, wherein the obtaining the pose vector comprises:

obtaining a first pose vector comprising a plurality of joint values constituting a first hand pose; and obtaining a second pose vector comprising a plurality of joint values constituting a second hand pose, and the obtaining the plurality of pose vectors comprises:

performing the interpolation by using the first pose vector corresponding to a first key image frame and the second pose vector corresponding to a second key image frame; and obtaining, through the interpolation, the plurality of pose vectors comprising joint values respectively corresponding to image frames between the first key image frame and the second key image frame.

12. The method of claim 8, wherein the obtaining the plurality of image frames representing the hand gesture comprises obtaining the plurality of image frames by combining the rendered three-dimensional character image with a background image.

13. The method of claim 8, wherein the obtaining the plurality of image frames representing the hand gesture comprises:

obtaining the plurality of image frames representing different hand poses by rendering the three-dimensional character image by using the joint values in the plurality of obtained pose vectors; and obtaining video data representing the hand gesture by sequentially arranging the plurality of obtained image frames.

14. The method of claim 8, further comprising:

obtaining position information and specification information of a camera in an augmented reality device; and modifying at least one of a position, a size, an angle, a color, a texture, and a depth value of the three-dimensional character image within the plurality of image frames, based on the obtained position information and the obtained specification information of the camera.

15. A computer program product comprising a non-transitory computer-readable storage medium having recorded thereon instructions for an electronic device to perform a method of obtaining image data representing a hand gesture, the method comprising:

obtaining a default joint value of at least one preset joint, among joint values for a plurality of joints constituting a hand pose;

determining whether to generate a joint value, based on correspondence between the obtained default joint value and the joint values for the plurality of joints;

generating, based on a result of the determining whether to generate the joint value, random joint values of joints other than the at least one preset joint, based on limitation information according to a human musculoskeletal system;

obtaining a pose vector corresponding to a key image frame by using the obtained default joint value and the generated random joint values;

obtaining a plurality of pose vectors by performing interpolation by using the obtained pose vector; and obtaining a plurality of image frames representing the hand gesture by rendering a three-dimensional character image by using the plurality of obtained pose vectors.

* * * * *